(12) United States Patent
Ohta et al.

(10) Patent No.: US 10,530,637 B2
(45) Date of Patent: Jan. 7, 2020

(54) WIRELESS COMMUNICATIONS SYSTEM, BASE STATION, AND TERMINAL

(71) Applicant: FUJITSU LIMITED, Kawasaki-shi, Kanagawa (JP)

(72) Inventors: Yoshiaki Ohta, Yokohama (JP); Shinichiro Aikawa, Yokohama (JP); Takayoshi Ode, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 10 days.

(21) Appl. No.: 15/660,190

(22) Filed: Jul. 26, 2017

(65) Prior Publication Data

US 2017/0324608 A1  Nov. 9, 2017

Related U.S. Application Data

(63) Continuation of application No. PCT/JP2015/052075, filed on Jan. 26, 2015.

(51) Int. Cl.
   *H04L 12/24* (2006.01)
   *H04W 12/06* (2009.01)
   (Continued)

(52) U.S. Cl.
   CPC ......... *H04L 41/0668* (2013.01); *H04W 12/06* (2013.01); *H04W 24/04* (2013.01);
   (Continued)

(58) Field of Classification Search
   CPC ..... H04W 76/14; H04W 8/005; H04W 24/10; H04W 48/16; H04W 4/50; H04W 4/70;
   (Continued)

(56) References Cited

U.S. PATENT DOCUMENTS

2014/0155114 A1* 6/2014 Wu ................... H04W 76/23
                                                          455/509
2015/0119049 A1  4/2015 Isobe et al.
(Continued)

FOREIGN PATENT DOCUMENTS

JP  10-304425 A   11/1998
JP  2010-233184 A  10/2010
(Continued)

OTHER PUBLICATIONS

Extended European search report with supplementary European search report and the European search opinion issued by the European Patent Office for corresponding European Patent Application No. 15879874.4, dated Nov. 22, 2017.
(Continued)

Primary Examiner — Awet Haile
(74) Attorney, Agent, or Firm — Myers Wolin, LLC.

(57) ABSTRACT

A wireless communications system includes a packet core network, and a wireless access network including a base station and a terminal. The wireless communications system includes plural terminals; and a base station configured to perform a process related to a proximity-based communications service between the plural terminals and when a failure in a connection between the base station and the packet core network occurs, the base station causes execution of proximity-based communication between the plural terminals by using the process related to the proximity-based communications service and performing authentication and authorization of communication with a terminal connected to the base station among the plural terminals.

8 Claims, 16 Drawing Sheets

(51) Int. Cl.
| | |
|---|---|
| H04W 92/18 | (2009.01) |
| H04W 76/10 | (2018.01) |
| H04W 76/18 | (2018.01) |
| H04W 24/04 | (2009.01) |
| H04W 36/00 | (2009.01) |
| H04W 92/04 | (2009.01) |
| H04W 76/14 | (2018.01) |
| H04W 36/30 | (2009.01) |

(52) U.S. Cl.
CPC ........... *H04W 36/03* (2018.08); *H04W 76/10* (2018.02); *H04W 76/18* (2018.02); *H04W 92/18* (2013.01); *H04W 36/305* (2018.08); *H04W 76/14* (2018.02); *H04W 92/045* (2013.01)

(58) Field of Classification Search
CPC ......... H04W 72/0446; H04W 72/1268; H04W 72/1284; H04W 76/23; H04W 76/27; H04W 92/18; H04W 12/06; H04W 36/00; H04W 36/0011; H04W 36/0016; H04W 36/0027; H04W 36/0061; H04W 36/0066; H04W 36/0072; H04W 36/0079; H04W 36/0088; H04W 36/03; H04W 36/08; H04W 40/20; H04W 40/34; H04W 48/08; H04W 52/0251; H04W 52/367; H04W 52/383; H04W 60/04; H04W 60/06; H04W 72/02; H04W 72/0406; H04W 72/042; H04W 72/1205; H04W 76/11; H04W 76/28; H04W 76/34; H04W 88/04; H04W 8/14; H04W 8/22; H04W 92/04; H04W 92/10; H04L 5/00; H04L 1/0003; H04L 1/0009; H04L 1/0038; H04L 1/0046; H04L 2209/76; H04L 63/0428; H04L 63/083; H04L 63/0884; H04L 67/2861; H04L 9/3271
See application file for complete search history.

(56) References Cited

U.S. PATENT DOCUMENTS

| | | | |
|---|---|---|---|
| 2017/0230847 | A1* | 8/2017 | Aminaka ............... H04W 24/04 |
| 2018/0014337 | A1 | 1/2018 | Kuge et al. |

FOREIGN PATENT DOCUMENTS

| | | |
|---|---|---|
| JP | 2013-131788 A | 7/2013 |
| JP | 2013-223194 A | 10/2013 |
| JP | 2018-505629 A | 2/2018 |
| WO | 2014095680 A1 | 6/2014 |
| WO | 2016/103671 A1 | 6/2016 |
| WO | 2016/117505 A1 | 7/2016 |

OTHER PUBLICATIONS

3GPP TS 22.346 v13.0.0, "3rd Generation Partnership Project; Technical Specification Group Services and System Aspects; Isolated Evolved Universal Terrestrial Radio Access Network (E-UTRAN) operation for public safety; Stage 1 (Release 13)", Sep. 2014.
Intel, "Text proposal for Handover Procedure between WiMAX and UTRAN", Agenda Item: 6, 3GPP TSG-RAN WG2 Meeting #60, R2-075126, Jeju Island, Korea, Nov. 5-11, 2007.
3GPP TS 36.300 V12.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Mar. 2014.
3GPP TS 36.211 V12.1.0, "3rd Generation Partnership Project; Technical Specification Group Radio Access Network; Evolved Universal Terrestrial Radio Access (E-UTRA); Physical channels and modulation (Release 12)", Mar. 2014.
3GPP TS 36.212 V12.0.0, "3rd Generation Partnership Project; Technical Specification Group Radio Access Network; Evolved Universal Terrestrial Radio Access (E-UTRA); Multiplexing and channel coding (Release 12)", Dec. 2013.
3GPP TS 36.213 V12.1.0, "3rd Generation Partnership Project; Technical Specification Group Radio Access Network; Evolved Universal Terrestrial Radio Access (E-UTRA); Physical layer procedures (Release 12)", Mar. 2014.
3GPP TS 36.321 V12.0.0, "3rd Generation Partnership Project; Technical Specification Group Radio Access Network; Evolved Universal Terrestrial Radio Access (E-UTRA); Medium Access Control (MAC) protocol specification (Release 12)", Dec. 2013.
3GPP TS 36.322 V11.0.0, "3rd Generation Partnership Project; Technical Specification Group Radio Access Network; Evolved Universal Terrestrial Radio Access (E-UTRA); Radio Link Control (RLC) protocol specification (Release 11)", Sep. 2012.
3GPP TS 36.323 V11.2.0, "3rd Generation Partnership Project; Technical Specification Group Radio Access Network; Evolved Universal Terrestrial Radio Access (E-UTRA); Packet Data Convergence Protocol (PDCP) specification Release 11)", Mar. 2013.
3GPP TS 36.331 V12.0.0, "3rd Generation Partnership Project; Technical Specification Group Radio Access Network; Evolved Universal Terrestrial Radio Access (E-UTRA); Radio Resource Control (RRC); Protocol specification (Release 12)", Dec. 2013.
3GPP TS 36.413 V12.0.0, "3rd Generation Partnership Project; Technical Specification Group Radio Access Network; Evolved Universal Terrestrial Radio Access Network (E-UTRAN); S1 Application Protocol (S1AP) (Release 12)", Dec. 2013.
3GPP TS 36.423 V12.0.0, "3rd Generation Partnership Project; Technical Specification Group Radio Access Network; Evolved Universal Terrestrial Radio Access Network (E-UTRAN); X2 application protocol (X2AP) (Release 12)", Dec. 2013.
3GPP TR 36.842 V12.0.0, "3rd Generation Partnership Project; Technical Specification Group Radio Access Network; Study on Small Cell enhancements for E-UTRA and E-UTRAN; Higher layer aspects (Release 12)", Dec. 2013.
3GPP TR 36.843 V12.0.0, "3rd Generation Partnership Project; Technical Specification Group Radio Access Network; Study on LTE device to device proximity services; Radio aspects (Release 12)", Mar. 2014.
3GPP TR 22.897 V13.0.0, "3rd Generation Partnership Project; Technical Specification Group Services and System Aspects; Study on Isolated Evolved Universal Terrestrial Radio Access Network (E-UTRAN) Operation for Public Safety (Release 13)", Jun. 2014.
3GPP TS 23.303 V12.0.0, "3rd Generation Partnership Project; Technical Specification Group Services and System Aspects; Proximity-based services (ProSe); Stage 2 (Release 12)", Feb. 2014.
3GPP TS 24.301 V12.6.0, "3rd Generation Partnership Project; Technical Specification Group Core Network and Terminals; Non-Access-Stratum (NAS) protocol for Evolved Packet System (EPS); Stage 3 (Release 12)", Sep. 2014.
3GPP TS 22.346 V0.2.0, "3rd Generation Partnership Project; Technical Specification Group Services and System Aspects; Isolated E-UTRAN Operation for Public Safety; Stage 1 (Release 13)", Aug. 2014.
OTD, "Comments and Questions on S2-140577", Agenda Item: 6.2, SA WG2 Meeting #101bis, S2-140699 San Jose Del Cabo, Mexico, Feb. 17-21, 2014.
International Search Report issued for corresponding International Patent Application PCT/JP2015/052075, dated Mar. 31, 2015, with an English translation.
International Preliminary Report on Patentability for corresponding International Patent Application No. PCT/JP2015/052075, dated Mar. 31, 2015, with partial English translation.
Communication pursuant to Article 94(3) EPC issued by the European Patent Office for corresponding European Patent Application No. 15 879 874.4-1218, dated Aug. 20, 2018.

(56) References Cited

OTHER PUBLICATIONS

Samsung et al., "IOPS solution for backhaul-less scenario", Agenda Item: 7.20, 3GPP SA WG2 Meeting #107, 32-150346, Sorrento, Italy, Jan. 26-30, 2015.

Notification of Reasons for Refusal issued by the Japan Patent Office for corresponding Japanese Patent Application No. 2016-571528, dated May 29, 2018, with an English translation.

Notice of Preliminary Rejection issued by the Korean Intellectual Property Office for corresponding Korean Patent Application No. 10-2017-7020460, dated Dec. 15, 2017, with partial English translation.

First Notification of Office Action issued by the China National Intellectual Property Administration for corresponding Chinese Patent Application No. 201580074450.8, dated Nov. 6, 2019, with an English translation.

* cited by examiner

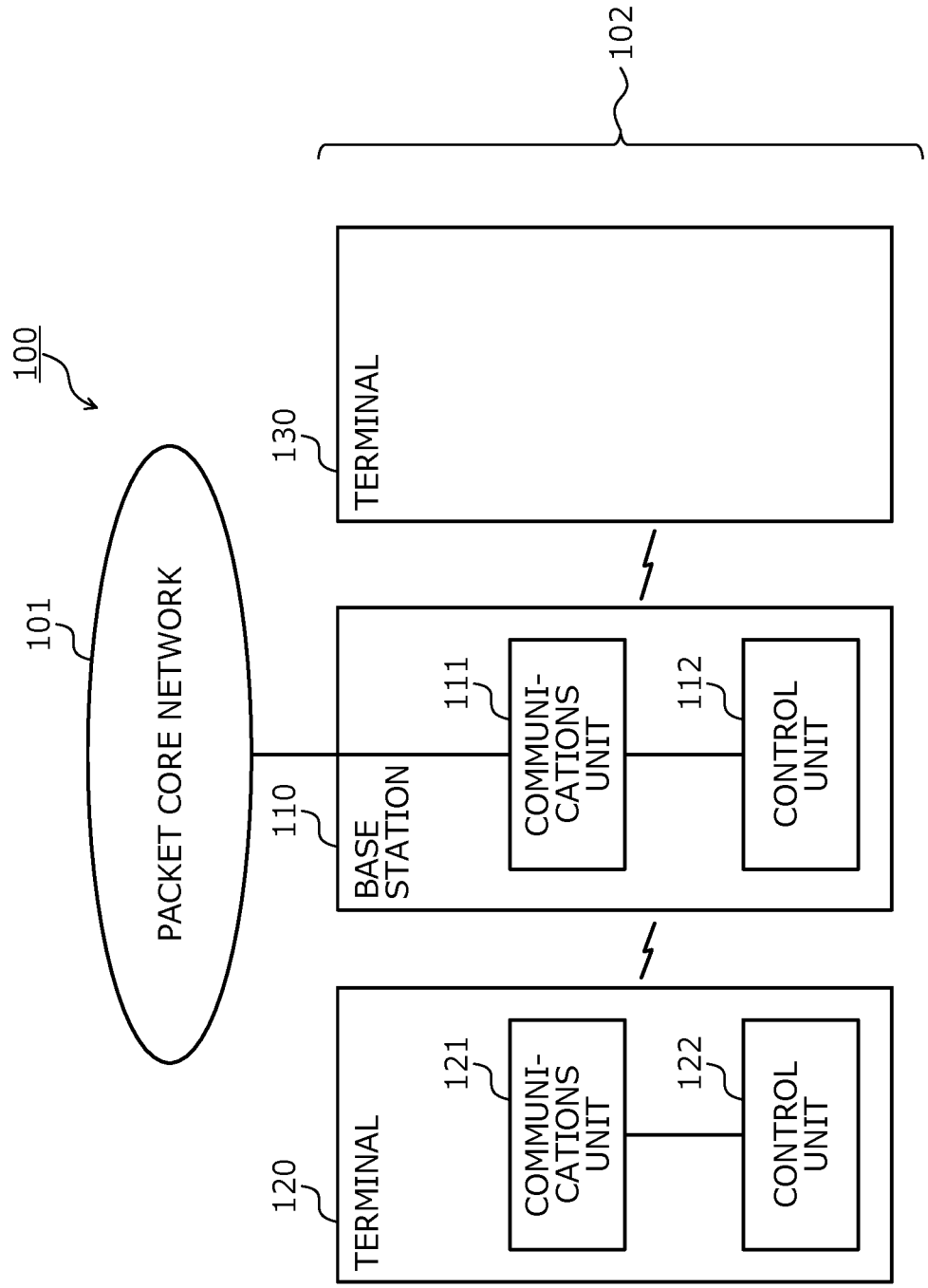

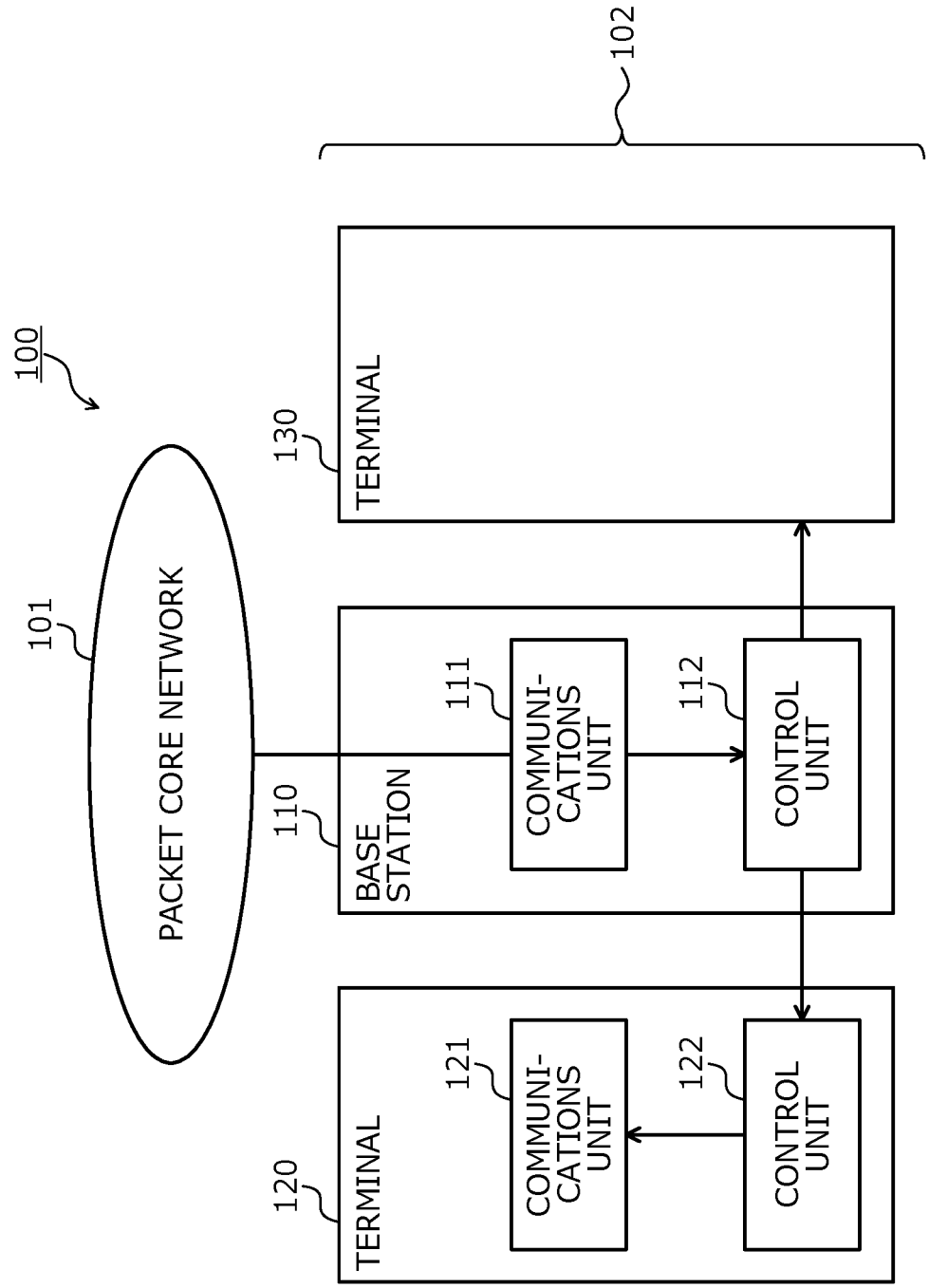

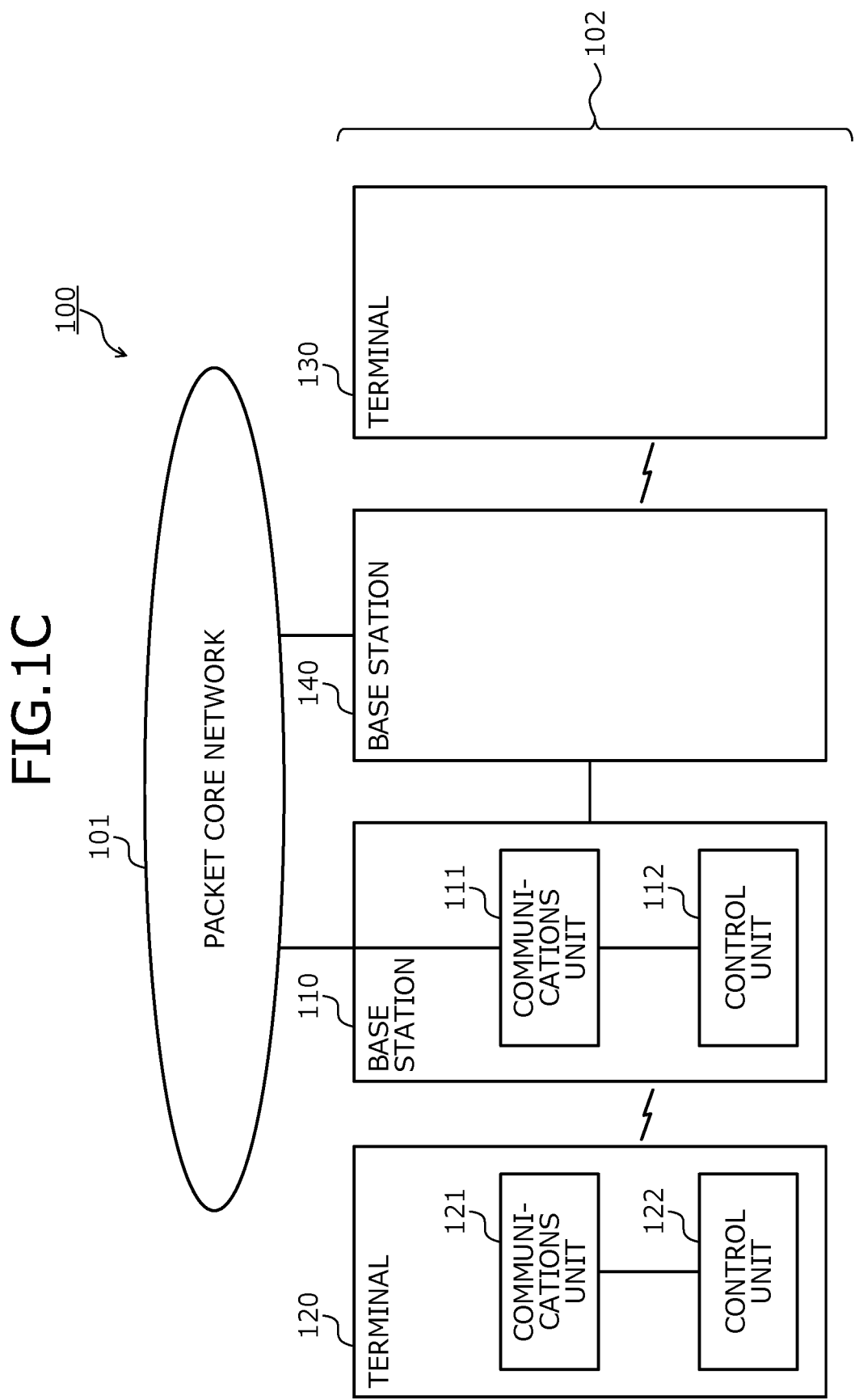

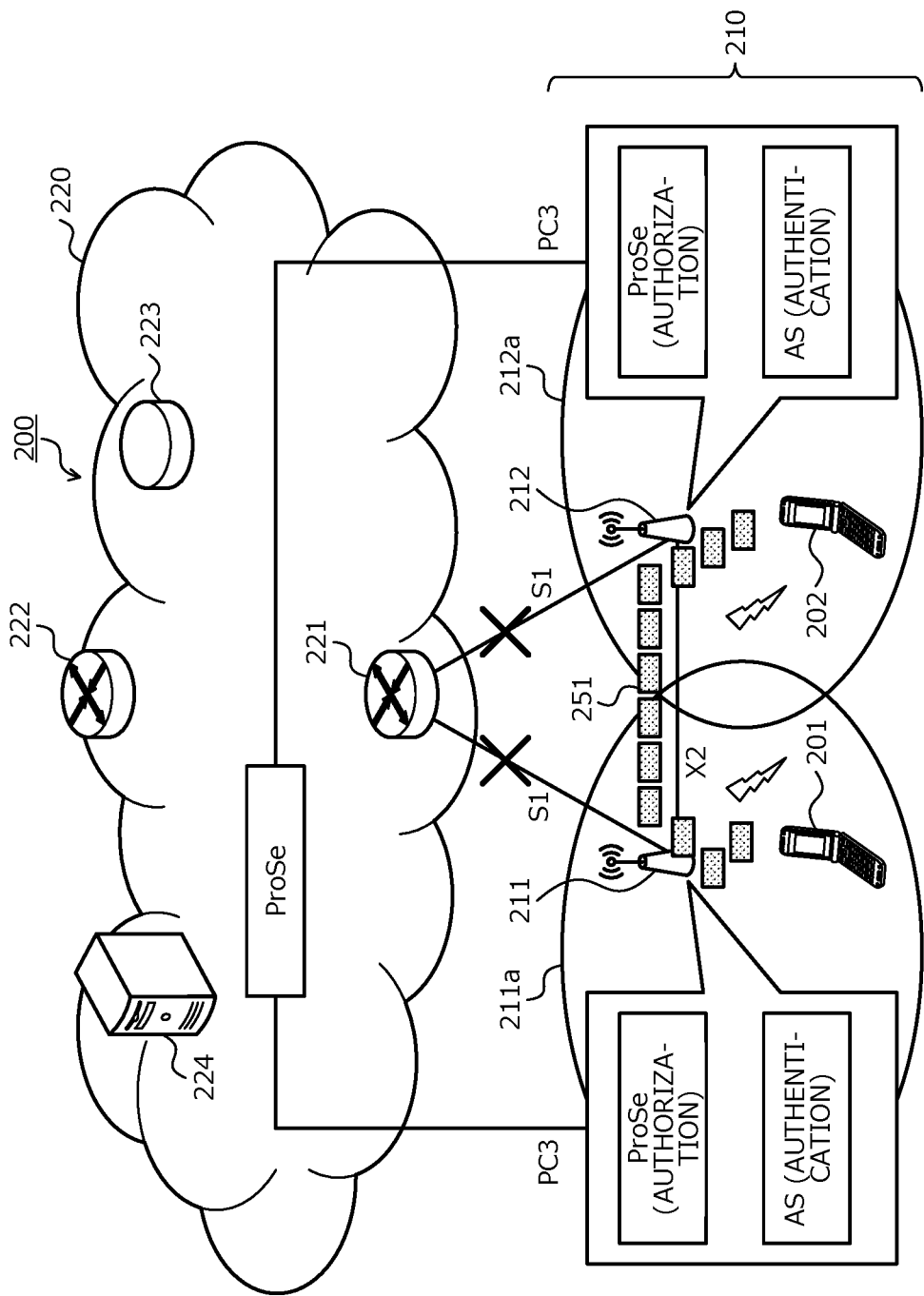

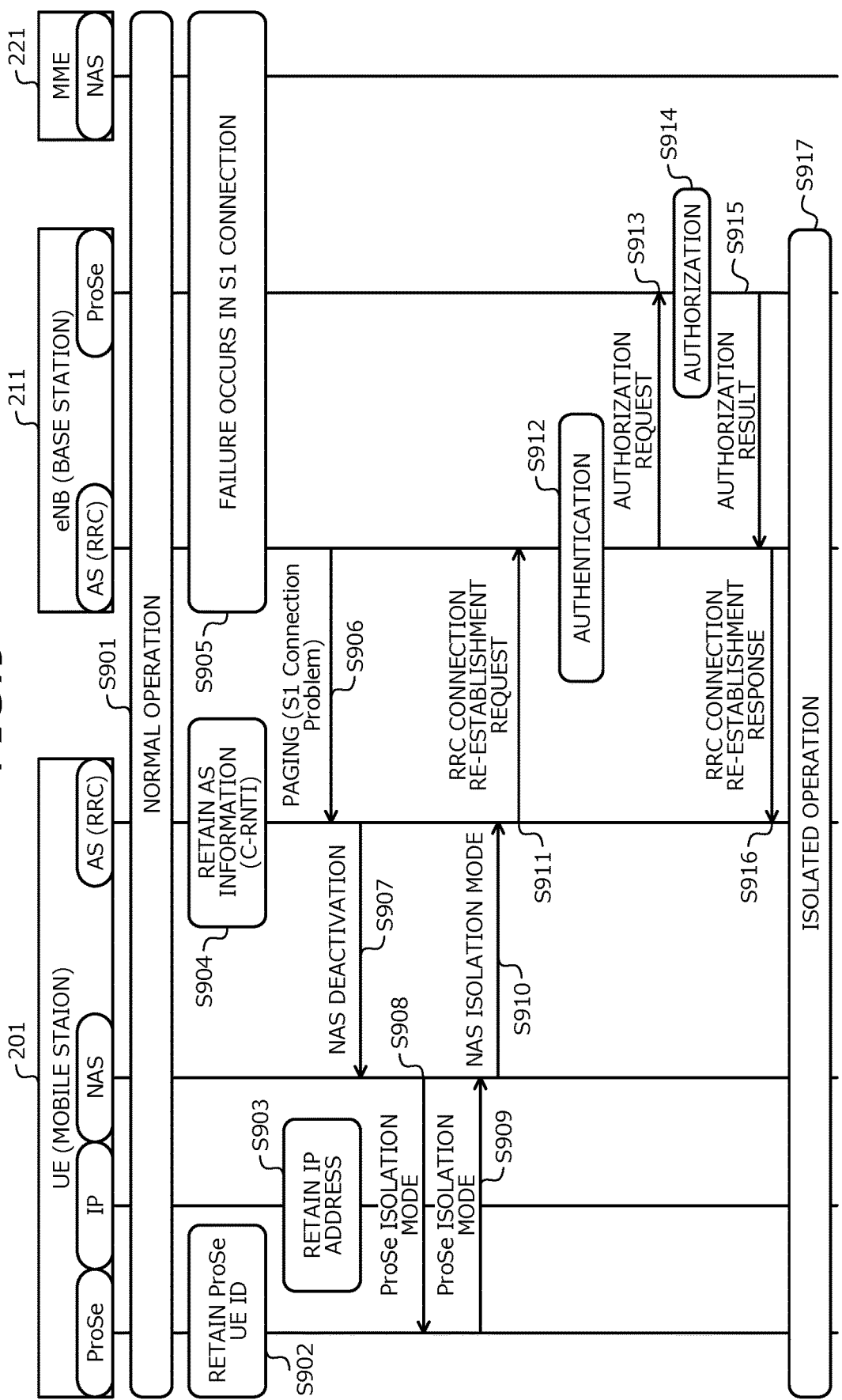

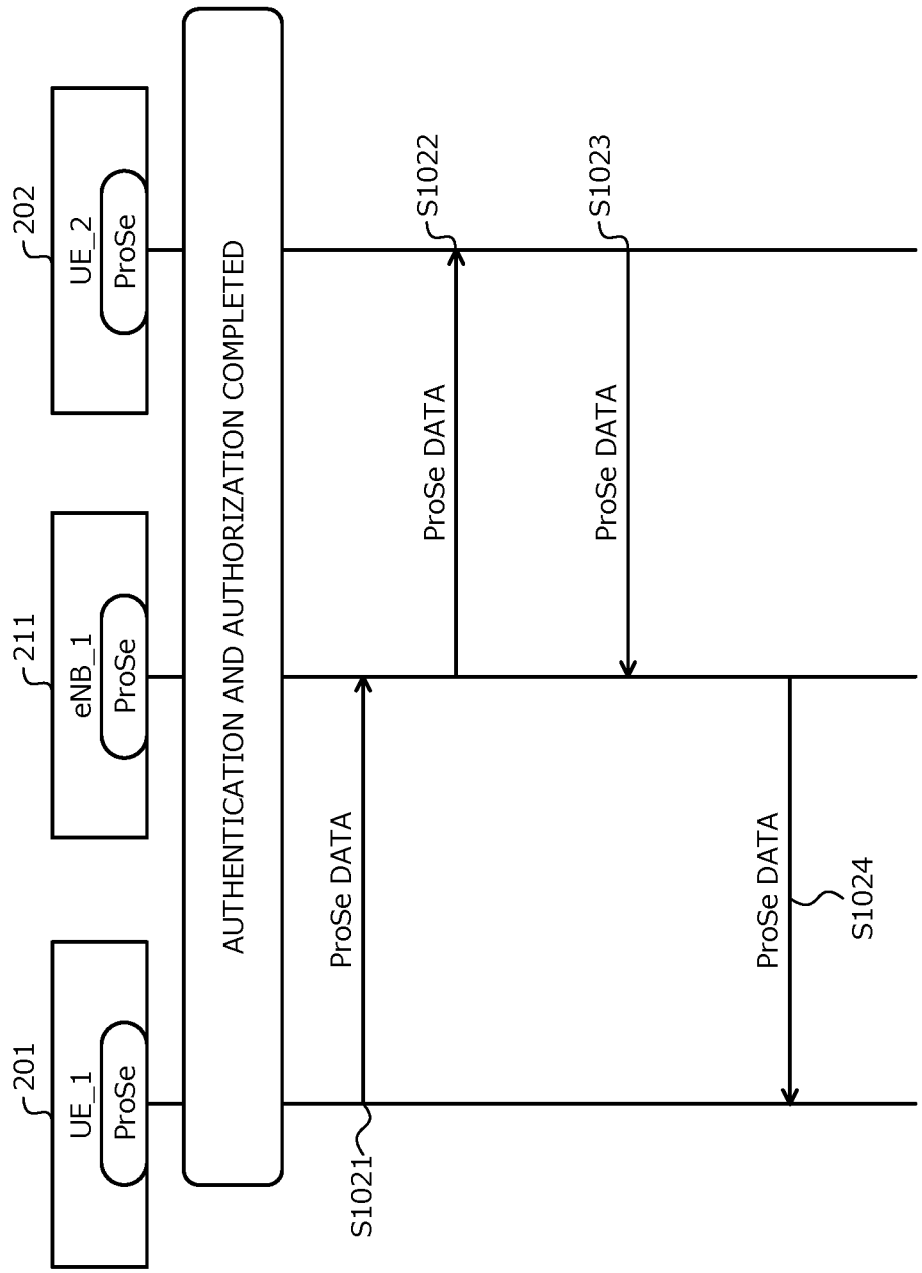

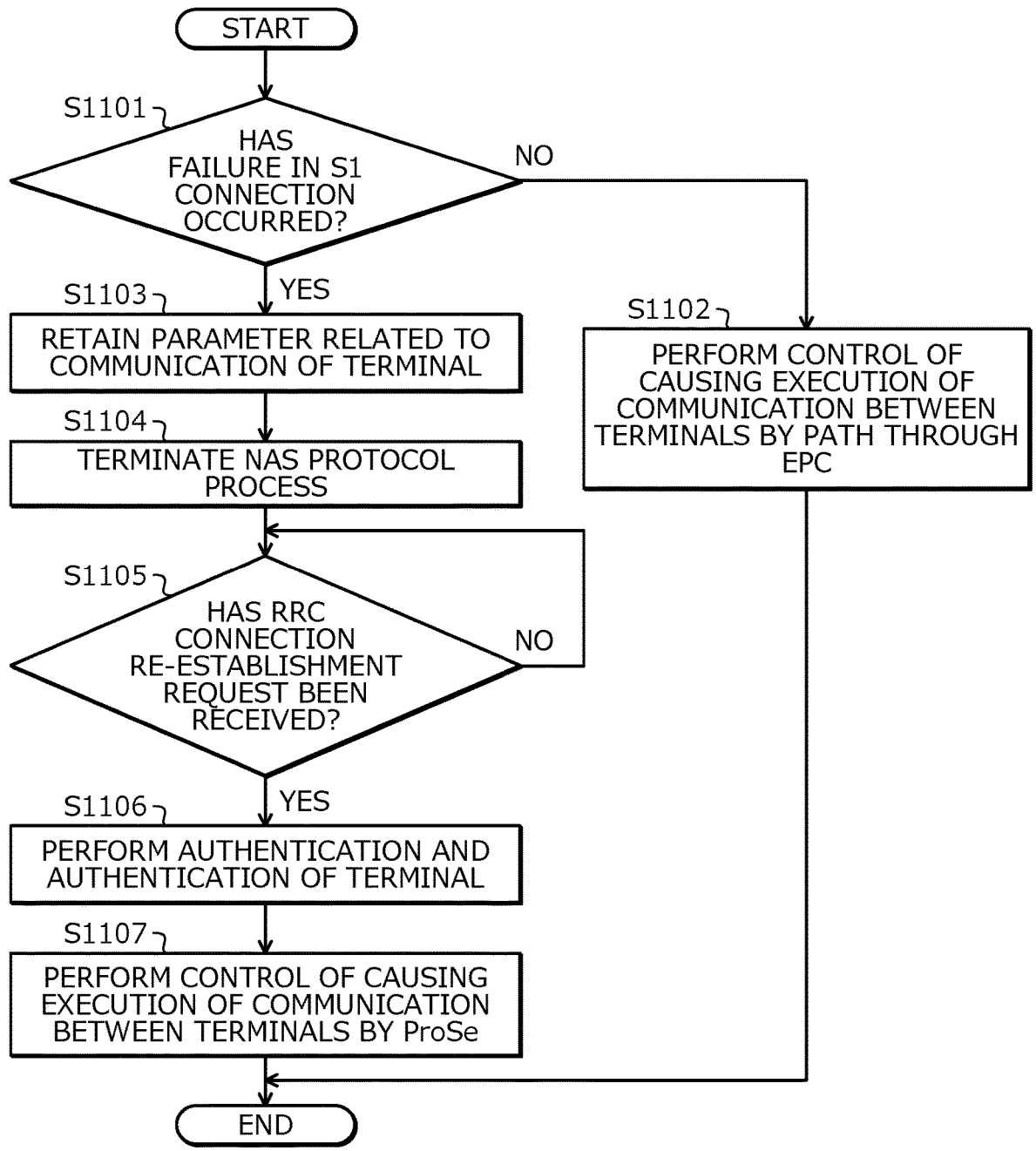

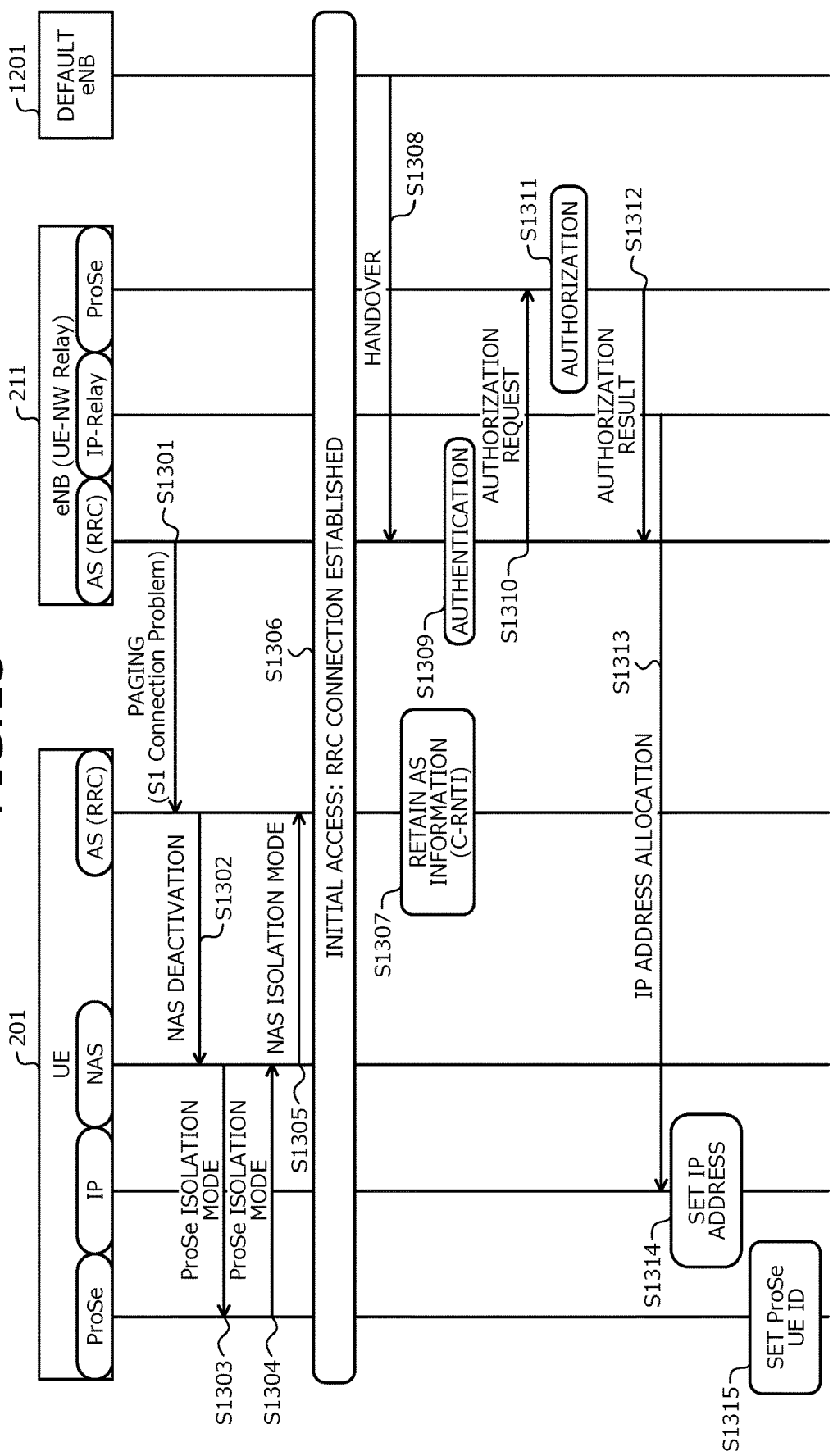

WIRELESS COMMUNICATIONS SYSTEM, BASE STATION, AND TERMINAL

CROSS REFERENCE TO RELATED APPLICATIONS

This application is a continuation application of International Application PCT/JP2015/052075, filed on Jan. 26, 2015, and designating the U.S., the entire contents of which are incorporated herein by reference.

FIELD

The embodiments discussed herein relates to a wireless communications system, a base station, and a terminal.

BACKGROUND

Mobile communication such as Long Term Evolution (LTE) and LTE-advanced are conventionally known (for example, refer to 3GPP TS36.300 V12.1.0, March 2014; 3GPP TS36.211 V12.1.0, March 2014; 3GPP TS36.212 V12.0.0, December 2013; 3GPP TS36.213 V12.1.0, March 2014; 3GPP TS36.321 V12.0.0, December 2013; 3GPP TS36.322 V11.0.0, September 2012; 3GPP TS36.323 V11.2.0, March 2013; 3GPP TS36.331 V12.0.0, December 2013; 3GPP TS36.413 V12.0.0, December 2013; 3GPP TS36.423 V12.0.0, December 2013; 3GPP TR36.842 V12.0.0, December 2013; and 3GPP TS24.301 v12.6.0, September 2014). Further, Proximity-based Services (ProSe) (function of direct communication between terminals) enabling direct communication between terminals is being studied (for example, refer to 3GPP TR36.843 V12.0.0, March 2014; and 3GPP TS23.303 v12.0.0, February 2014).

Isolated E-UTRAN Operation for Public Safety (IOPS) enabling continuous communication even when a wireless access network is isolated from a packet core network is being studied (for example, refer to 3GPP TR22.897 v13.0.0, June 2014). A packet core network is, for example, an Evolved Packet Core (EPC).

Further, according to a known a technique, when a femto base station or a gateway device detects transmission failure with a core network, instead of the core network, call connection is established between mobile stations within the cellular coverage of the femto base station (for example, refer to Japanese Laid-Open Patent Publication No. 2010-233184).

According to another known technique, when a communication line failure between a base station and a higher device occurs, the base station changes the simultaneous call area number of the base station ID to be broadcast and causes communication terminals in the cell of the base station to perform position registration (for example, refer to Japanese Laid-Open Patent Publication No. 2013-131788).

According to another known technique, when a switch is congested and the switch denies a terminal's request for communication with another terminal, direct communication between the terminals is permitted (for example, refer to Japanese Laid-Open Patent Publication No. 2013-223194).

According to another known technique, when a communication line connection between a base station and a control station is lost, the base station terminates the transfer of a mobile-originated call signal to the control station from a mobile station of the call originating side and transmits the call signal to a mobile station of the call receiving side, allowing the mobile station to receive the call (for example, refer to Japanese Laid-Open Patent Publication No. H10-304425).

SUMMARY

According to an aspect of an embodiment, a wireless communications system includes a packet core network, and a wireless access network including a base station and a terminal. The wireless communications system includes plural terminals; and a base station configured to be capable of performing a process related to a proximity-based communications service between the plural terminals and when a failure in a connection between the base station and the packet core network occurs, the base station causes execution of proximity-based communication between the plural terminals by performing authentication and authorization of communication with a terminal connected to the base station among the plural terminals by using the process related to the proximity based communications.

An object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1A is a diagram of an example of a wireless communications system according to a first embodiment;

FIG. 1B is a diagram of an example of signal flow in the wireless communications system depicted in FIG. 1A;

FIG. 1C is a diagram depicting a modified example of the wireless communications system according to the first embodiment;

FIG. 2 is a diagram of an example of the wireless communications system according to a second embodiment;

FIG. 9 is a sequence diagram of an example of processing when a UE is connected to an isolated wireless access network in the second embodiment;

FIG. 10B is a sequence diagram of another example of communication by the isolated wireless access network;

FIG. 11 is a flowchart of an example of processing by an eNB;

FIG. 13 is a sequence diagram of processing when a UE connects to the isolated wireless access network in the third embodiment.

DESCRIPTION OF THE INVENTION

Figure 3:
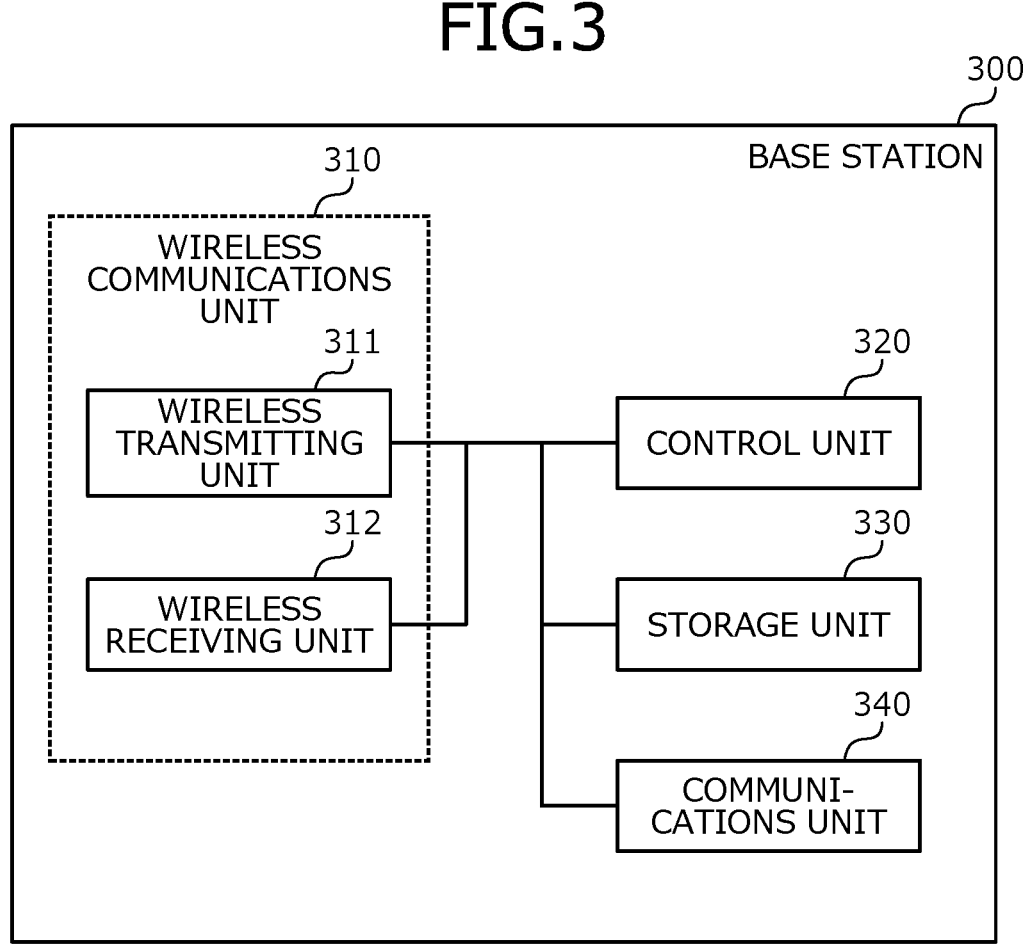
FIG. 3 is a diagram depicting one example of a base station.

Embodiments of a wireless communications system, a base station, and a terminal according to the present invention will be described in detail with reference to the accompanying drawings.

FIG. 1A is a diagram of an example of the wireless communications system according to a first embodiment. FIG. 1B is a diagram of an example of signal flow in the wireless communications system depicted in FIG. 1A. As depicted in FIGS. 1A and 1B, a wireless communications system 100 according to the first embodiment includes a packet core network 101 and a wireless access network 102. The wireless access network 102 includes a base station 110 and terminals 120, 130. The packet core network 101 is a communications network that does not include the base station 110 and, for example, is a communications network of a higher level than the base station 110. In other words, the packet core network 101 is an (inter-base station) access network between the base station 110 and another base station.

The base station 110 performs wireless communication with the terminals 120, 130 and thereby relays communication between the terminals 120, 130. For example, the base station 110 includes a communications unit 111 and a control unit 112.

The communications unit 111 communicates with the packet core network 101. As a result, for example, communication between the terminals 120, 130 and the packet core network 101 can be relayed. Further, communication between the terminals 120, 130 via the base station 110 and the packet core network 101 can be relayed.

Further, the communications unit 111 detects connection failures between the packet core network 101 and the base station 110 (the base station thereof). The communications unit 111 notifies the control unit 112 of a result of detection of a connection failure between the packet core network 101 and the base station 110.

A connection failure between the packet core network 101 and the base station 110 is, for example, a state in which communication between the packet core network 101 and the base station 110 is impossible (communication disconnection). Alternatively, a connection failure between the packet core network 101 and the base station 110 may be a decrease in communication throughput between the packet core network 101 and the base station 110, or the like. Further, one example of connection failure between the packet core network 101 and the base station 110 is failure occurring as a consequence of a natural disaster such as an earthquake or tsunami, etc.

For example, the communications unit 111 monitors a communications state between the communications unit 111 and the packet core network 101 and thereby can detect connection failure between the packet core network 101 and the base station 110. A communication state between the communications unit 111 and the packet core network 101 is, for example, the communication speed, whether there is response from the packet core network 101 with respect to signal transmission from the communications unit 111, etc. Alternatively, the communications unit 111 may detect connection failure between the packet core network 101 and the base station 110 by receiving from another communications apparatus, information indicating that connection failure between the packet core network 101 and the wireless access network 102 has occurred.

The control unit 112 controls communication between the terminals 120, 130. For example, the control unit 112 transmits control signals to the terminals 120, 130 and thereby controls the communication between the terminals 120, 130. A control signal transmitted by the control unit 112 to the terminals 120, 130 is, for example, a response to a communications request from the terminals 120, 130 to the base station 110, information indicating a radio resource or the like to be used by the terminals 120, 130 in wireless communication with the base station 110.

Further, the control unit 112 is capable of processing related to proximity-based communications services between terminals. A proximity-based communications service between terminals is, for example, ProSe. Processing related to proximity-based communications services between terminals is, for example, a process of accessing a communications apparatus that provides a proximity-based communications service. A communications apparatus that provides a proximity-based communications service, for example, is a ProSe function (ProSe Function). For example, the communications unit 111 has a ProSe layer processing unit and therefore, is capable of processing related to proximity-based communications services between terminals.

Further, based on notification from the communications unit 111, when a failure in a connection between the packet core network 101 and the base station 110 has occurred, the control unit 112 performs authentication (Authentication) and authorization (approval: Authorization) of communication with the terminals 120, 130 and thereby causes execution of proximity-based communication between the terminals 120, 130.

Authentication is, for example, a process of identifying the identity of a terminal (user). In other words, authentication is a process of, for example, accepting a connection request from a proper terminal and denying a connection request from an illicit terminal to prevent illicit use by the terminal (user). Authorization (approval) is, for example, a process of performing access control of a terminal (user). In other words, authorization is, for example, a process of determining from the background of a terminal (user) obtained by authentication, a communication service that is to be permitted to the terminal.

Communication caused to be executed between the terminals 120, 130 by the control unit 112 is, for example, communication by a path that does not pass through the packet core network 101. For example, communication caused to be executed between the terminals 120, 130 by the control unit 112 is communication via the base station 110. Alternatively, communication caused to be executed between the terminals 120, 130 by the control unit 112 may be direct wireless communication between the terminals 120, 130. Communication by ProSe is one example of communication caused to be executed between the terminals 120, 130 by the control unit 112.

The terminals 120, 130 are mobile stations that perform wireless communication with the base station 110. For example, the terminal 120 includes a communications unit 121 and a control unit 122. The communications unit 121 is capable of communicating with other terminals (for example, the terminal 130). The control unit 122 controls communication by the communications unit 121 based on a control signal transmitted from the base station 110. Although configuration of the terminal 120 has been described, configuration of the terminal 130 is also the same as the configuration of the terminal 120.

Thus, according to the first embodiment, using a process related to proximity-based communications services between terminals, the base station 110 performs authentication and authorization of the terminals 120, 130 and is thereby able to cause proximity-based communication between the terminals 120, 130 to be executed. As a result, communication between terminals can be prevented from being terminated when a failure occurs in communication (access network between base stations) between the packet core network 101 and the wireless access network 102. Prevention of communication disconnection is, for example, preventing a state in which communication is impossible from continuing for a long period.

FIG. 1C is a diagram depicting a modified example of the wireless communications system according to the first embodiment. In FIG. 1C, portions identical to those depicted in FIGS. 1A and 1B are given the same reference characters used in FIGS. 1A and 1B, and description thereof is omitted hereinafter. As depicted in FIG. 1C, in the first embodiment, the wireless access network 102 may include the base station 110 and a base station 140, and the terminal 130 may be connected to the base station 140. The base station 140 is connected to the base station 110 by, for example, an X1 interface or the like. The base station 140 has, for example, the same configuration as that of the base station 110.

In this case, when a failure in communication between the packet core network 101 and the base station 110 occurs, the control unit 112 of the base station 110 performs authentication and authorization of communication with the terminal 120 connected to the base station 110 and thereby causes proximity-based communication to be executed between the terminals 120, 130. In this case, for example, the base station 140 uses a process related to proximity-based communications services between terminals and performs authentication and authorization of communication at the terminal 130 connected to the base station 140.

Further, communication caused to be executed between the terminals 120, 130 by the control unit 112 is communication via the base station 110 and the base station 140. In the communication between the base station 110 and the base station 140 in this case, for example, an X2 connection, etc. can be used. Alternatively, communication caused to be executed between the terminals 120, 130 by the control unit 112 may be direct wireless communication between the terminals 120, 130.

Thus, even when the terminals 120, 130 are connected to the base stations 110, 140, respectively, using a process related to proximity-based communications services between terminals, the base stations 110, 140 can perform authentication and authorization of the terminals 120, 130. As a result, proximity-based communication can be caused to be executed between the terminals 120, 130.

FIG. 2 is a diagram of an example of the wireless communications system according to a second embodiment. As depicted in FIG. 2, a wireless communications system 200 according to the second embodiment includes a wireless access network 210 and an EPC 220. The wireless access network 210 is a communications network on which wireless communication is performed. For example, the wireless access network 21 includes UEs 201, 202 (User Equipment: user terminal) and eNBs 211, 212 (evolved Node B).

The EPC 220 is a packet core network in the wireless communications system 200. For example, the EPC 220 includes an MME 221 (Mobility Management Entity), a gateway 222 (S/PGW), an HSS 223 (Home Subscriber Server), and a ProSe function 224.

Each of the UEs 201, 202 performs wireless communication with at least one of the eNBs 211, 212, by which wireless communication with the EPC 220 via at least one of the eNBs 211, 212 can be possible. Further, the UEs 201, 202 are capable of communicating with each other via at least one of the eNBs 211, 212. In the example depicted in FIG. 2, the UE 201 is located in a cell 211a of the eNB 211 and is performing wireless communication with the eNB 211. The UE 202 is located in a cell 212a of the eNB 212 and is performing wireless communication with the eNB 212.

Each of the eNBs 211, 212 performs wireless communication with the UEs 201, 202, by which it relays communication between the EPC 220 and the UEs 201, 202. Further, each of the eNBs 211, 212 is connected to the MME 221 via e.g. an S1 interface. Further, the eNBs 211, 212 are each connected to the ProSe function 224 via e.g. a PC3 interface. Further, each of the eNBs 211, 212 is connected with each other via e.g. an X2 interface.

The MME 221 accommodates the eNBs 211, 212 and performs a Control plane (C-plane) process for network control.

The gateway 222 is a gateway in the EPC 220. For example, the gateway 222 includes a Serving Gateway (S-GW) that manages a User-plane of user data, a Packet data network Gateway (P-GW) for connecting to an external network, a corporate intranet, etc. The HSS 223 is a server that manages service control and subscriber data.

The ProSe function 224 is a communications apparatus that performs a process related to proximity-based communications services (ProSe) at the UEs 201, 202. For example, the ProSe function 224 can obtain position information related to the positions of the UEs 201, 202 in order to provide ProSe.

For example, the ProSe function 224 can obtain position information based on report information from the UEs 201, 202. The report information, for example, is information that indicates measurement results of position coordinates of the UEs 201, 202, obtained by a Global Positioning System (GPS) unit in the UEs 201, 202. Alternatively, the report information may be identification information of the cell or base station to which the UEs 201, 202 are connected. The ProSe function 224 may be an independent communications apparatus or may be provided in another communications apparatus.

Further, the eNB 211 and the eNB 212 are configured to support a ProSe protocol. The ProSe protocol may be configured as, for example, a higher layer of a Radio Resource Control (RRC) protocol, a layer 2 (L2) protocol, and a physical layer (PHY) protocol.

As a result, the eNBs 211, 212 are capable of accessing the ProSe protocol of the ProSe function 224. In this access, for example, a PC3 interface can be used. In a conventional system, although a PC3 interface is an interface between a ProSe function and a ProSe application (the ProSe protocol) supported by the terminal, this is equivalent to use also as an interface of the ProSe function and a base station (for example, the eNBs 211, 212). Note that another name besides PC3 interface may be used. As a result, the eNBs 211, 212 are capable of using the ProSe protocol and causing the execution of communication by proximity-based communications services (ProSe) for the UEs 201, 202. Further, the "ProSe protocol" does not represent the protocol itself and may be a position and process function involved with ProSe. For example, although various parameters necessary in ProSe communication are normally set from the ProSe function at the time of communication, here, the process function may be one that receives and stores settings from the ProSe function in advance and not at the time of communication.

In the example depicted in FIG. 2, the UEs 201, 202 are connected to and communicating with the eNBs 211, 212, respectively. Fault is assumed to occur with a S1 connection between the eNB 211 and the MME 221 and a S1 connection between the eNB 212 and the MME 221. As a result, connectivity of the eNBs 211, 212 to the EPC 220 is lost.

The eNB 211, when losing connectivity to the EPC 220, retains a parameter for the communication of the UE 201 and uses the retained parameter to perform authentication and authorization (approval) for continuing the communication of the UE 201. Parameters for the communication of the UE 201 include, for example, UE capability, UE context, etc. UE capability is, for example, information related to communication function corresponding to the UE 201. UE context is, for example, a parameter allocated to the UE 201 during the communication of the UE 201. The UE context may be included in the UE capability. Determination of whether failure in connectivity to the EPC 220 is occurring (whether connectivity is secured or has been lost) may be performed by an Operation and Management (O&M) system specified by the EPC. In this case, when the O&M system determines that connectivity has been lost, a base station (for example, the eNBs 211, 212) is notified.

For example, by a ProSe protocol (ProSe layer) process, the eNB 211 retains a parameter for communication of the UE 201 and uses the retained parameter to perform authorization for continuing the communication of the UE 201. Further, by a ProSe protocol (ProSe layer) process, the eNB 211 controls a communication authentication function of an Access Stratum ((AS): access layer) protocol (AS layer) and thereby performs authentication for the UE 201.

Similarly, when losing connectivity to the EPC 220, the eNB 212 also retains a parameter for the communication of the UE 202 and uses the retained parameter to perform authentication and authorization for continuing the communication of the UE 202. As a result, via the eNBs 211, 212, execution of proximity-based communication between the UEs 201, 202 is enabled. Packets 251 depicted in FIG. 2 are packets transmitted and received by proximity-based communication between the UEs 201, 202, via the eNBs 211, 212.

Thus, even when the wireless access network 210 is isolated from the EPC 22, authentication and authorization for continuing communication can be performed for the UEs 201, 202 by a ProSe protocol (ProSe layer) process supported by the eNBs 211, 212. As a result, even when the wireless access network 210 is isolated from the EPC 220, communication between the UEs 201, 202 may be continued by proximity-based communication. Continuation of communication is, for example, avoiding communication disconnection for long intervals and can include temporary terminations of disconnection.

The packet core network 101 depicted in FIGS. 1A to 1C, for example, can be realized by the EPC 220. The wireless access network 102 depicted in FIGS. 1A to 1C, for example, can be realized by the wireless access network 210. The base stations 110, 140 depicted in FIGS. 1A to 1C, for example, can be realized by the eNBs 211, 212. The terminals 120, 130 depicted in FIGS. 1A to 1C, for example, can be realized by the UEs 201, 202.

FIG. 3 is a diagram depicting one example of the base station. Each of the eNBs 211, 212 can be realized by, for example, a base station 300 depicted in FIG. 3. As depicted in FIG. 3, the base station 300 includes, for example, a wireless communications unit 310, a control unit 320, a storage unit 330, and a communications unit 340. The wireless communications unit 310 includes a wireless transmitting unit 311 and a wireless receiving unit 312. These structures are developed so as to enable unidirectional or bidirectional input and output of data and signals.

The wireless transmitting unit 311 transmits user data and a control signal by wireless communication, via an antenna. A wireless signal transmitted by the wireless transmitting unit 311 can include arbitrary user data, control information, etc. (that has been encoded, modulated, etc.). The wireless receiving unit 312 receives user data and control signals by wireless communication, via an antenna. A wireless signal received by the wireless receiving unit 312 can include arbitrary user data, a control signal, etc. (that has been encoded, modulated, etc.). A common antenna may be used for transmission and reception.

The control unit 320 outputs to the wireless transmitting unit 311, user data and control signals that are to be transmitted to another wireless station. Further, the control unit 320 obtains user data and control signals received by the wireless receiving unit 312. The control unit 320 performs the input and output of programs, control information, user data, etc. with respect to the storage unit 330 described hereinafter. Further, the control unit 320 performs with respect to the communications unit 340 described hereinafter, the input and output of control signals and user data transmitted to and received from another communications apparatus, etc. The control unit 320 additionally performs various types of control in the base station 300.

The storage unit 330 stores various types of information such as user data, control information, programs, etc. The communications unit 340, for example, by a wired signal, transmits to and receives from another communications apparatus, user data and control signals.

The communications unit 111 of the base station 110 depicted in FIGS. 1A to 1C, for example, can be realized by the control unit 320 and the communications unit 340. The control unit 112 of the base station 110, for example, can be realized by the wireless communications unit 310 and the control unit 320.

Figure 4:
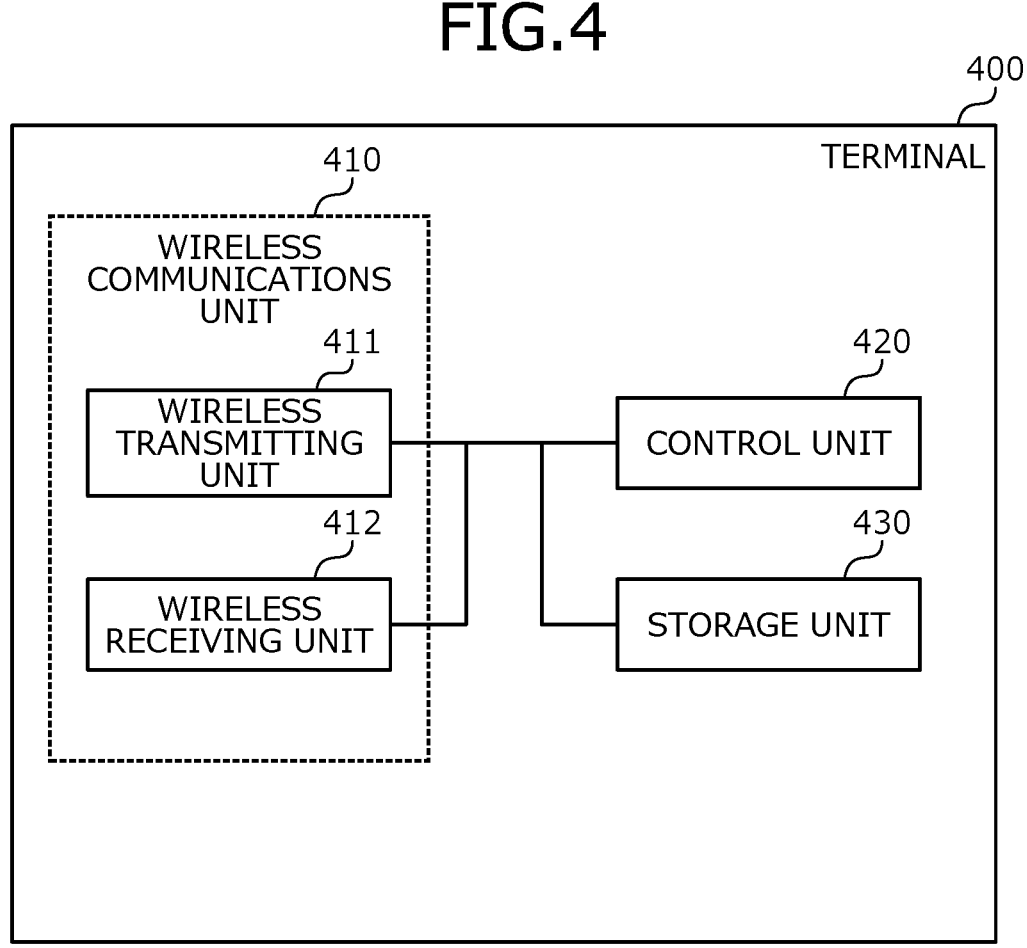
FIG. 4 is a diagram depicting one example of a terminal.

FIG. 4 is a diagram depicting one example of a terminal. The UEs 201, 202, for example, can be realized by a terminal 400 depicted in FIG. 4. The terminal 400 includes a wireless communications unit 410, a control unit 420, and a storage unit 430. The wireless communications unit 410 includes a wireless transmitting unit 411 and a wireless receiving unit 412. These structures are developed so as to enable unidirectional or bidirectional input and output of data and signals.

The wireless transmitting unit 411 transmits user data and a control signal by wireless communication, via an antenna. A wireless signal transmitted by the wireless transmitting unit 411 can include arbitrary user data, control information, etc. (that has been encoded, modulated, etc.). The wireless receiving unit 412 receives user data and control signals by wireless communication, via an antenna. A wireless signal received by the wireless receiving unit 412 can include arbitrary user data, a control signal, etc. (that has been encoded, modulated, etc.). A common antenna may be used for transmission and reception.

The control unit 420 outputs to the wireless transmitting unit 411, user data and control signals that are to be transmitted to another wireless station. Further, the control unit 420 obtains user data and control signals received by the wireless receiving unit 412. The control unit 420 performs the input and output of programs, control information, user data, etc. with respect to the storage unit 430 described hereinafter. Further, the control unit 420 performs with respect to a communications unit described hereinafter, the input and output of control signals and user data transmitted to and received from another communications apparatus, etc. The control unit 420 additionally performs various types of control in the terminal 400.

The storage unit 430 stores various types of information such as user data, control information, programs, etc.

The communications unit 121 of the terminal 120 depicted in FIGS. 1A to 1C, for example, can be realized by the wireless communications unit 410. The control unit 122 of the terminal 120 depicted in FIGS. 1A to 1C, for example, can be realized by the wireless communications unit 410 and the control unit 420.

Figure 5:
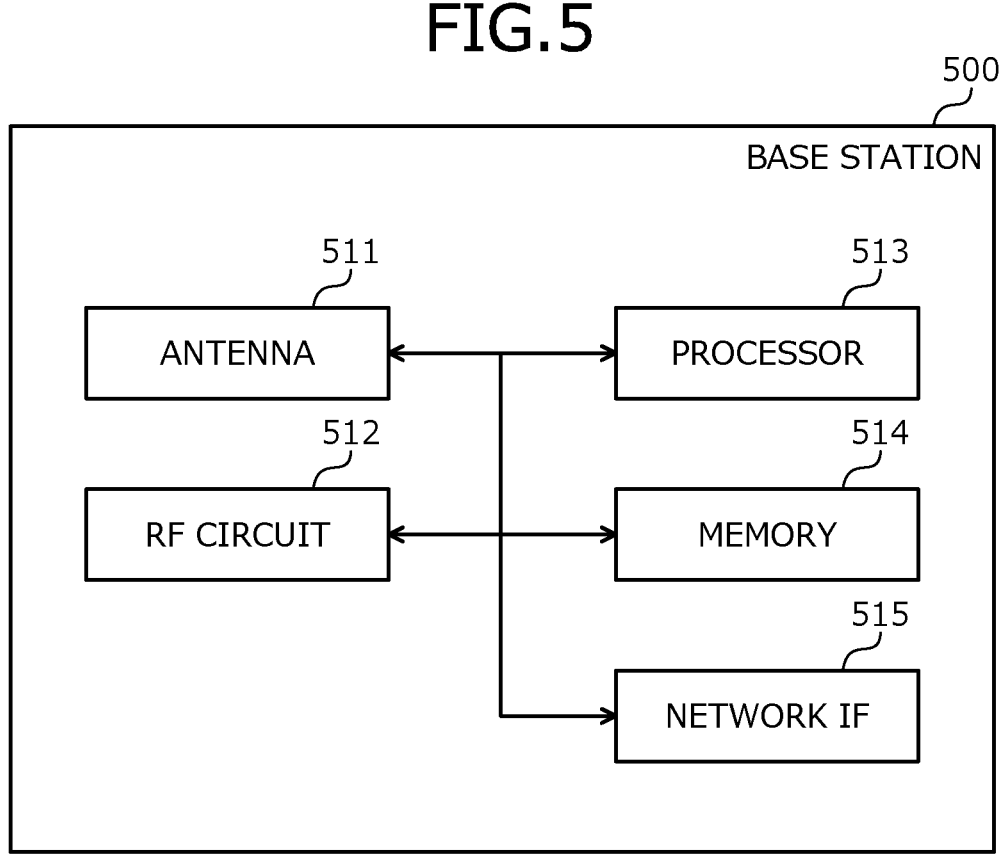
FIG. 5 is a diagram depicting one example of hardware configuration of the base station.

FIG. 5 is a diagram depicting one example of hardware configuration of the base station. The base station 300 depicted in FIG. 3, for example, can be realized by a base station 500 depicted in FIG. 5. The base station 500 includes an antenna 511, an RF circuit 512, a processor 513, a memory 514, and a network IF 515. These components, for example, are connected via a bus so as to enable the input and output of various signals and data.

The antenna 511 includes a transmission antenna that transmits wireless signals and a reception antenna that receives wireless signals. Further, the antenna 511 may be a common antenna used for both transmitting and receiving wireless signals. The RF circuit 512 performs a Radio Frequency ((RF): high frequency) process for signals received by the antenna 511 and signals transmitted by the antenna 511. The RF process, for example, includes frequency conversion for a baseband width and an RF band.

The processor 513, for example, is a central processing unit (CPU), a digital signal processor (DSP), or the like. Further, the processor 513 can be realized by a digital electronic circuit such as an Application Specific Integrated Circuit (ASIC), a Field Programmable Gate Array (FPGA), a Large Scale Integration ((LSI): large-scale integrated circuit), or the like.

The memory 514, for example, can be realized by flash memory, read-only memory (ROM), random access memory (RAM) such as Synchronous Dynamic Random Access Memory (SDRAM), etc. The memory 514 stores, for example, user data, control information, programs, and the like.

The network IF 515 is, for example, a communications interface that performs wired communication with a network. The network IF 515 may include, for example, an Xn interface for performing wired communication with a base station.

The wireless communications unit 310 depicted in FIG. 3, for example, can be realized by the RF circuit 512, or by the antenna 511 and the RF circuit 512. The control unit 320 depicted in FIG. 3, for example, can be realized by the processor 513 and the memory 514. The storage unit 330 depicted in FIG. 3, for example, can be realized by the memory 514. The communications unit 340 depicted in FIG. 3, for example, can be realized by the network IF 515.

Figure 6:
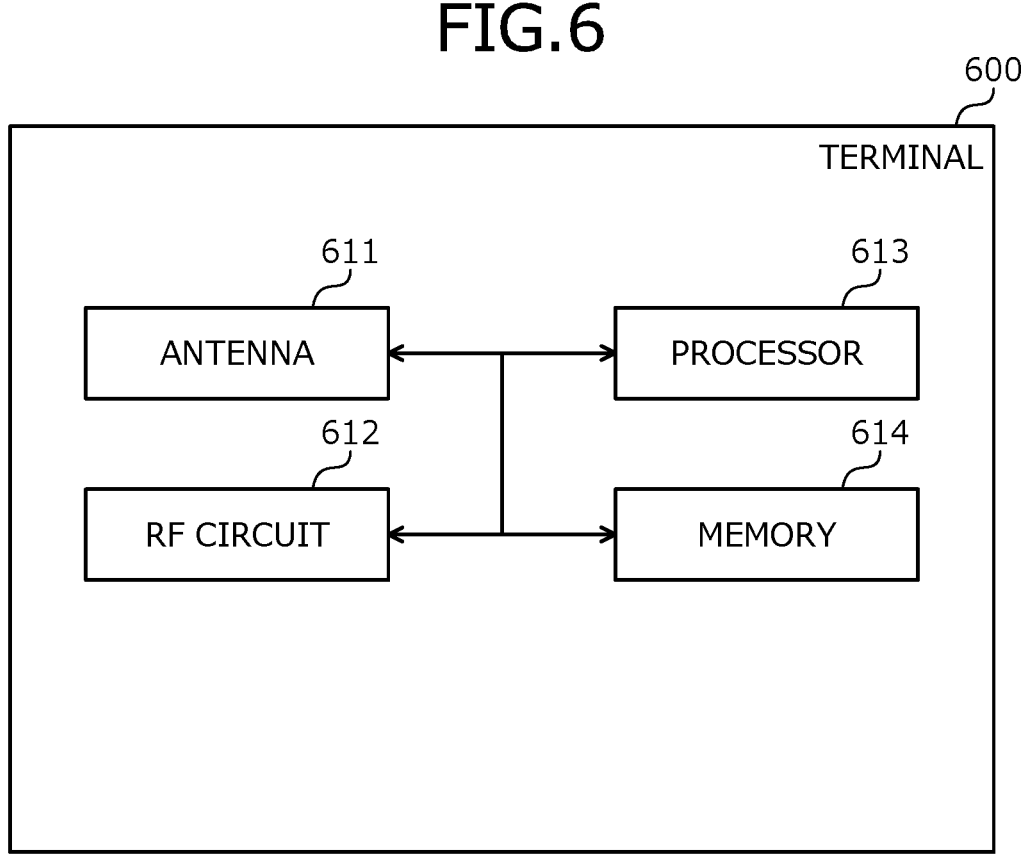
FIG. 6 is a diagram depicting one example of hardware configuration of the terminal.

FIG. 6 is a diagram depicting one example of hardware configuration of the terminal. The terminal 400, for example, can be realized by a terminal 600 depicted in FIG. 6. The terminal 600 includes, for example, an antenna 611, an RF circuit 612, a processor 613, and a memory 614. The components, for example, are connected via a bus so as to enable the input and output of various signals and data.

The antenna 611 includes a transmission antenna that transmits wireless signals and a reception antenna that receives wireless signals. Further, the antenna 611 may be a common antenna used for both transmitting and receiving wireless signals. The RF circuit 612 performs an RF process for signals received by the antenna 611 and for signals transmitted by the antenna 611. The RF process, for example, includes frequency conversion for a baseband width and an RF band.

The processor 613, for example, is a CPU, a DSP, or the like. Further, the processor 613 can be realized by a digital electronic circuit such as an ASIC, a FPGA, an LSI, or the like.

The memory 614, for example, can be realized by flash memory, ROM, RAM such as SDRAM, etc. The memory 614 stores, for example, user data, control information, programs, and the like.

The wireless communications unit 410 depicted in FIG. 4, for example, can be realized by the RF circuit 612, or by the antenna 611 and the RF circuit 612. The control unit 420 depicted in FIG. 4, for example, can be realized by the processor 613 and the memory 614. The storage unit 430 depicted in FIG. 4, for example, can be realized by the memory 614.

Figure 7:
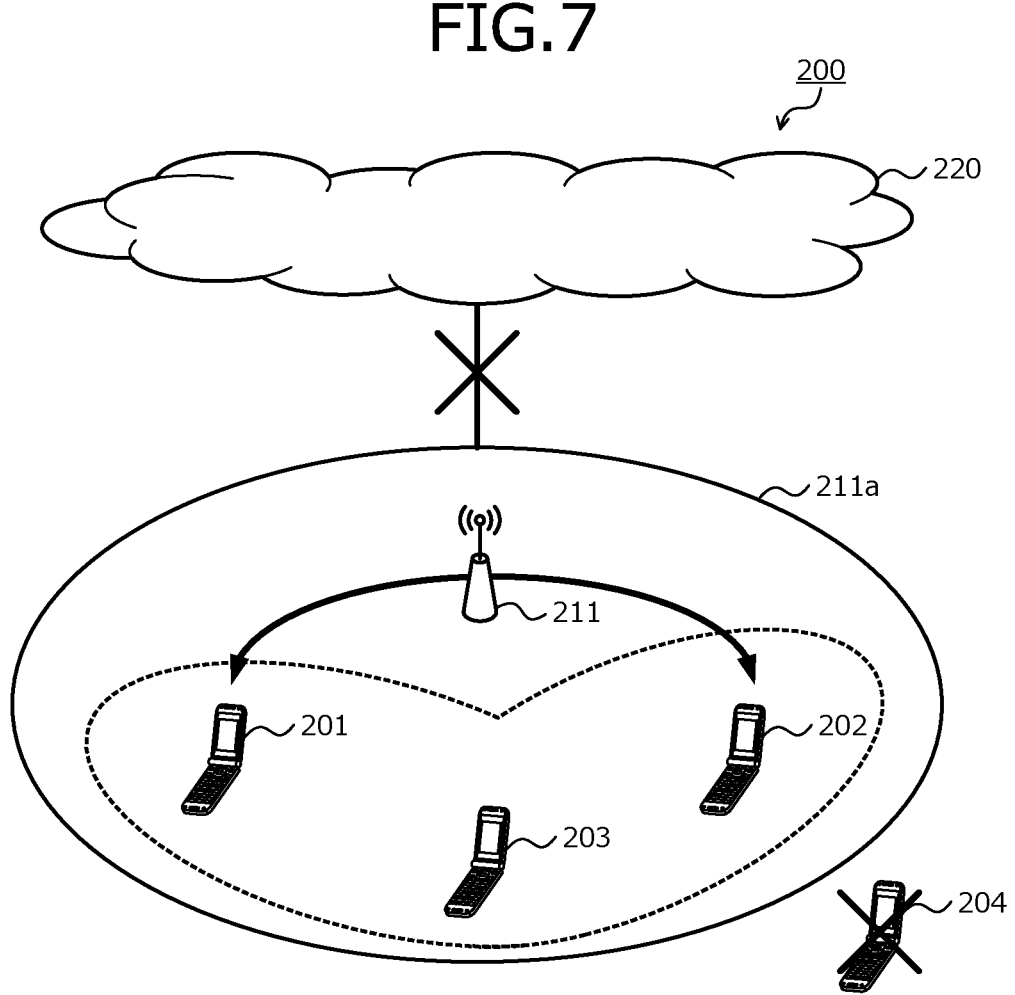
FIG. 7 is a diagram depicting one example of inter-terminal communication by IOPS.

FIG. 7 is a diagram depicting one example of inter-terminal communication by IOPS. In FIG. 7, portions depicted in FIG. 2 are given the same reference characters used in FIG. 2, and description thereof is omitted hereinafter. UEs 201 to 203 are UEs located in the cell 211a of the eNB 211. UE 204 is a UE located in a cell of an eNB different from the eNB 211.

In the example depicted in FIG. 7, the UE 201 and the UE 202 are on a shortcut path by the eNB 211 and communicate with each other through a path that does not pass through the EPC 220. In other words, each of the UE 201 and the UE 202 performs wireless communication with the eNB 211 and thereby communicates via the eNB 211.

As a result, the UE 201 and the UE 202 can communicate with each other through a path that does not pass through the EPC 220, even when the communications access network 210 is isolated from the EPC 220. Further, in the example depicted in FIG. 7, although an example of IOPS through one eNB (the eNB 211) is described, IOPS through plural eNBs may be performed. In this case, in the path between the plural eNBs, for example, an X2 can be used.

Figure 8:
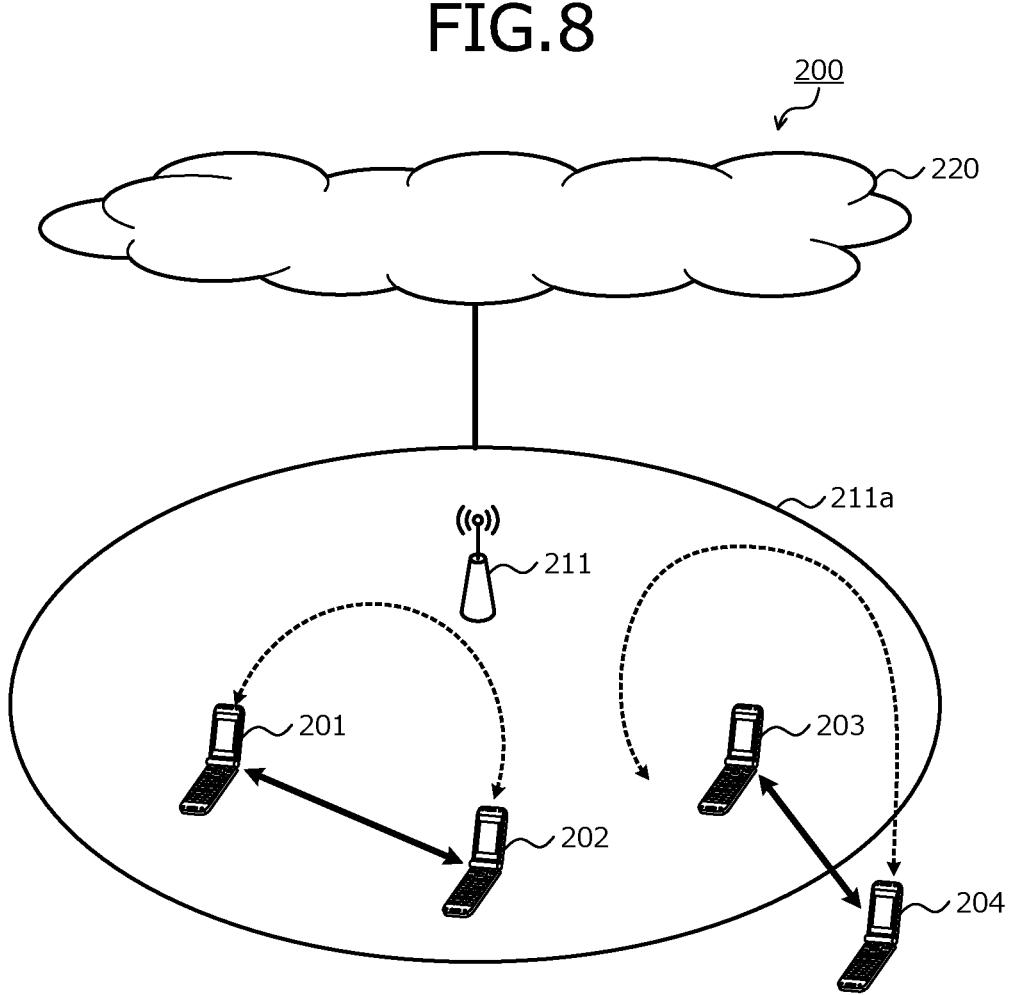
FIG. 8 is a diagram depicting one example of inter-terminal communication by ProSe.

FIG. 8 is a diagram depicting one example of inter-terminal communication by ProSe. In FIG. 8, portions identical to those depicted in FIG. 7 are given the same reference characters used in FIG. 7 and description thereof is omitted hereinafter. In the example depicted in FIG. 8, the UE 201 and the UE 202 in cellular coverage of the eNB 211 are performing direct wireless communication with each other under the control of the eNB 211.

Further, in the example depicted in FIG. 8, the UE 203 in cellular coverage of the eNB 211 and the UE 204 in cellular coverage of an eNB (for example, the eNB 212 depicted in FIG. 2) different from the eNB 211 are performing direct wireless communication with each other under the control of the eNB 211.

For example, the eNB 211 has the ProSe function depicted in FIG. 8 and can use the ProSe function to cause execution of proximity-based communication by ProSe between terminals in proximity of each other. As a result, execution of the communication by IOPS depicted in FIG. 7 can be caused between terminals.

FIG. 9 is a sequence diagram of an example of processing when a UE is connected to an isolated wireless access network in the second embodiment. FIG. 9 describes a case in which a failure (problem) occurs in a connection between the wireless access network 210 and the EPC 220 when the UE 201 is connected to the eNB 211 and communicating with the UE 202 via the eNB 211.

First, the UE 201 performs a normal operation (Normal Operation) for communicating with the UE 202 via the eNB 211 and the EPC 220 (the MME 221) (step S901). At step S901, for example, establishment of an RRC connection, etc. are included. As a result, communication between the UEs 201, 202, for example, via the eNB 211 and the MME 221 starts.

The UE 201, during communication with the UE 202, retains a ProSe UE ID of the terminal of the UE 201 (step S902). Step S902, for example, is performed according to the ProSe protocol of the UE 201. Further, the UE 201, during communication with the UE 202, retains an Internet Protocol (IP) address of the terminal of the UE 201 (step S903). Step S903, for example, is performed according to an IP protocol of the UE 201. For example, according to 3GPP TS23.303 v12.0.0, February 2014, although the ProSe UE ID is not specified by current specifications as a mobile station identifier of a transmission source in 1-to-many communication, here, the ProSe UE ID may be a general identifier to include 1-to-many communication.

Further, the UE 201, during communication with the UE 202, retains AS information of the UE 201 (step S904). The AS information includes, for example, a Cell-Radio Network Temporary Identifier (C-RNTI). Step S904, for example, is performed according to an AS (RRC) protocol of the UE 201.

Here, a failure in the S1 connection between the eNB 211 and the MME 221 is assumed to occur (step S905). A failure in the S1 connection is, for example, a state in which communication by the S1 connection has become impossible (communication disconnection). Alternatively, a failure in the S1 connection may be a decrease in communication throughput by the S1 connection, etc. Further, a failure in the S1 connection is, for example, a failure occurring consequent to an earthquake, a tsunami, etc. As described above, determination of whether a failure in a connection has occurred may be performed by an O&M system prescribed by EPC.

The eNB 211 detects the occurrence of the failure in the S1 connection between the eNB 211 and the MME 221. For example, the eNB 211 is able to detect a failure in the S1 connection between the eNB 211 and the MME 221 by monitoring the communication state between the eNB 211 and the MME 221. The communication state between the eNB 211 and the MME 221, for example, is the communication speed, whether there is response from the MME 221, etc.

In this case, the eNB 211 performs transmission of a page (paging) to the UE 201, indicating that a failure has occurred in the S1 connection (S1 Connection Problem) (step S906). Step S906, for example, is performed according to an AS (RRC) protocol of the UE 201 and the eNB 211. By step S906, a process of a Non Access Stratum ((NAS): non-access layer) protocol for performing communication with the EPC 220 can be aborted for the UE 201.

In the example depicted in FIG. 9, although a method has been described in which the eNB 211 uses paging to notify the UE 201 that a failure in the S1 connection has occurred, the method of notifying the UE 201 that a failure in the S1 connection has occurred is not limited hereto. For example, the eNB 211 may use a broadcast channel to broadcast to UEs including the UE 201, notification that a failure has occurred in the S1 connection. Further, the eNB 211 retains a parameter (UE context) related to communication performed by the UE 201.

In these processes, for example, a System Information Update process can be used. In particular, a base station (for example, the eNB 211) simultaneously transmits when a Value Tag specified in System Information Block 1 (SIB1) is set, a System Information Block that is transmitted when a failure occurs in the S1 connection. A terminal (for example, the UE 201), when detecting that the Value Tag of the SIB1 has been set, receives the described System Information Block and thereby determines that a failure in the S1 connection is occurring. In the described System Information Block, the cause of the failure may be described. The terminal may further determine whether the present method is to be implemented depending on the cause of the failure. For example, if S1 throughput has degraded, there is a possibility of recovery and therefore, implementation of the present method may be delayed by a predetermined amount of time.

Next, an AS (RRC) protocol processing unit of the UE 201 outputs to a NAS protocol processing unit of the UE 201, NAS deactivation (NAS Deactivation) requesting termination of a process by the NAS protocol (step S907).

Next, the NAS protocol processing unit of the UE 201 makes a request to a Prose protocol processing unit of the UE 201, for transition to a ProSe isolation mode (ProSe Isolated Mode) (step S908). The ProSe isolation mode is a mode of performing communication between terminals by ProSe in a state of being isolated from the EPC 220. In step S908, the Prose protocol processing unit of the UE 201 is activated and the UE 201 transitions to the ProSe isolation mode.

Next, the Prose protocol processing unit of the UE 201 notifies the NAS protocol processing unit of the UE 201, of the transition to the ProSe isolation mode (step S909). Next, with respect to the AS (RRC) protocol of the UE 201, the NAS protocol processing unit of the UE 201 gives notification of the termination of a process by the NAS protocol (NAS isolation mode) (step S910).

Next, the UE 201 transmits to the eNB 211, an RRC connection re-establishment request (RRC Connection Re-establishment Request) (step S911). The RRC connection re-establishment request transmitted at step S911 is a reconnection request requesting re-establishment of an RRC connection. Step S911, for example, is performed according to the AS (RRC) protocol of the UE 201 and the eNB 211. Step S911, for example, also requests the eNB 211 for authentication.

The RRC connection re-establishment request transmitted at step S911 includes C-RNTI, PCI, and short MAC-I. Further, a ProSe UE ID may be transmitted in parallel with an RRC connection establishment request (may be transmitted by the same message or by a separate message). The ProSe UE ID is, for example, the ProSe UE ID retained by the UE 201 at step S902.

C-RNTI is, for example, the C-RNTI retained by the UE 201 at step S904 and is, for example, 16-bit identification information (UE-ID) of the UE 201 used in a serving cell of the UE 201. PCI is, for example, an identifier for identifying the serving cell of the UE 201 in the physical layer and is 9-bit identification information.

Short MAC-I is, for example, a 15-bit or 16-bit security parameter generated using VarShortMAC-Input obtained from the cell ID, PCI, and C-RNTI. For example, short MAC-I is the extracted 16 least significant bits of MAC-I that is falsification check code calculated with respect to VarShortMAC-Input, using a security algorithm and security key currently used by the UE.

Next, the eNB 211 performs authentication (Authentication) for the UE 201 (step S912). Step S912, for example, is performed according to the AS (RRC) protocol of the eNB

211. As step S912, for example, the eNB 211 performs authentication by comparing the retained UE context of the UE 201 and the C-RNTI of the UE 201 included in the RRC connection re-establishment request transmitted at step S911. Further, the eNB 211 may perform authentication by comparing the retained UE context of the UE 201 and the PCI or the short MAC-I included in the RRC connection re-establishment request transmitted at step S911.

Next, the AS (RRC) protocol processing unit of the eNB 211 makes an authorization request (Authorization Request) to the ProSe protocol processing unit of the eNB 211 for the UE 201 (step S913). The authorization request at step S913 is performed, for example, by the AS (RRC) protocol processing unit of the eNB 211 notifying the ProSe protocol processing unit of the eNB 211 of the ProSe UE ID of the UE 201. Here, although the UE 201 is assumed to transmit the ProSe UE ID, the ProSe UE ID is not necessarily required. In other words, if the eNB 211 stores combinations of C-RNTI and ProSe UE IDs, the ProSe UE ID can be automatically calculated from C-RNTI.

Next, the eNB 211 performs authorization (Authorization) for the UE 201 by the ProSe protocol processing unit (step S914). For example, the eNB 211 performs authorization for the UE 201, based on the retained UE context of the UE 201 and the ProSe UE ID of the UE 201 notified by the authorization request at step S913. Further, when the ProSe UE ID is not notified by the UE 201, the eNB 211 may automatically calculate the ProSe UE ID from C-RNTI as described.

In the example depicted in FIG. 9, at step S914, communication with the UE 202 by ProSe at the UE 201 is assumed to be authorized. Next, the ProSe protocol processing unit of the eNB 211 notifies the AS (RRC) protocol processing unit of the authorization result (Authorization) obtained at step S914 (step S915).

Next, the eNB 211 transmits to the UE 201, a RRC connection re-establishment response indicating re-establishment of the RRC connection (step S916). The RRC connection re-establishment response includes, for example, C-RNTI (new C-RNTI) newly allocated to the UE 201. Step S916, for example, is performed according to the AS (RRC) protocol of the UE 201 and the eNB 211.

As a result, communication (isolated operation) between the UE 201 and the UE 202 by a path that passes through the eNB 211 and does not pass through the EPC 220 such as the MME 221 starts (step S917). The communication started at step S917, for example, is performed according to the ProSe protocol of the eNB 211 and the UEs 201, 202. Further, the eNB 211 terminates processing of communicating with the EPC 220.

As depicted in FIG. 9, when a failure occurs in an S1 connection when the UEs 201, 202 are communicating with each other by a path passing through the eNB 211 and the EPC 220, the eNB 211 retains a parameter related to the communication at the UE 201 connected to the eNB 211. As a result, the eNB 211 is able to perform authentication and authorization of the communication for the UE 201, based on the retained parameter.

Further, the RRC connection re-establishment request transmitted at step S911 may include an indicator indicating that the RRC connection re-establishment request is to notify the occurrence of a failure in the S1 connection. In other words, in the RRC connection re-establishment request, information (indicator) may be implicitly included to indicate that the RRC connection re-establishment request is a reconnection request consequent to the eNB 211 causing with respect to the UE 201, termination of processing of communicating with the EPC 220. As a result, the eNB 211 is able to determine whether a received RRC connection re-establishment request is consequent to notification of the occurrence of a failure in the S1 connection or consequent to another factor. When the ProSe UE ID is also transmitted with the RRC connection re-establishment request, the ProSe UE ID itself may be implicit information (indicator).

Radio Link Failure (RLF) between the UE 201 and the eNB 211 is an example of another factor different from notification of an occurrence of a failure in the S1 connection, causing transmission of an RRC connection re-establishment request. Another example of a factor different from notification of an occurrence of a failure in the S1 connection, causing transmission of an RRC connection re-establishment request is an occurrence of a failure in the S1 connection and the UE 201 not receiving notification of the occurrence of the failure.

The eNB 211 transitions to step S912 when determining that the received RRC connection re-establishment request is to notify an occurrence of a failure in the S1 connection. As a result, communication with the UE 201 by ProSe not passing through the EPC 220 is started.

Further, for example, the eNB 211 performs the same normal operation as that at step S901 when determining that the RRC connection re-establishment request is consequent to another factor different from notification of an occurrence of a failure in the S1 connection. As a result, the RRC connection of the UE 201 is re-established and communication of the UE 201 by a path passing through the EPC 220 is resumed.

Therefore, for example, when the UE 201 transmits an RRC connection re-establishment request due to an RLF between the UE 201 and the eNB 211, the RRC connection of the UE 201 can be re-established compared to a case where an occurrence of a failure in the S1 connection is notified. Alternatively, in a case in which the failure occurring in the S1 connection is a decrease in throughput, for example, causing execution of communication by a path passing through the EPC 220 can be limited to a terminal that could not receive the notification of the failure in the S1 connection.

Alternatively, transmission of the RRC connection re-establishment request transmitted at step S911 may be transmission by a channel different from an RRC connection re-establishment request transmitted when RLF occurs between the UE 201 and the eNB 211. For example, the UE 201 can use a Logical Channel ID (LCID) and switch the channel transmitting the RRC connection re-establishment request.

As a result, the eNB 211 is able to determine whether a received RRC connection re-establishment request is due to RLF between the UE 201 and the eNB 211 or due to an occurrence of a failure in the S1 connection.

Figure 10A:
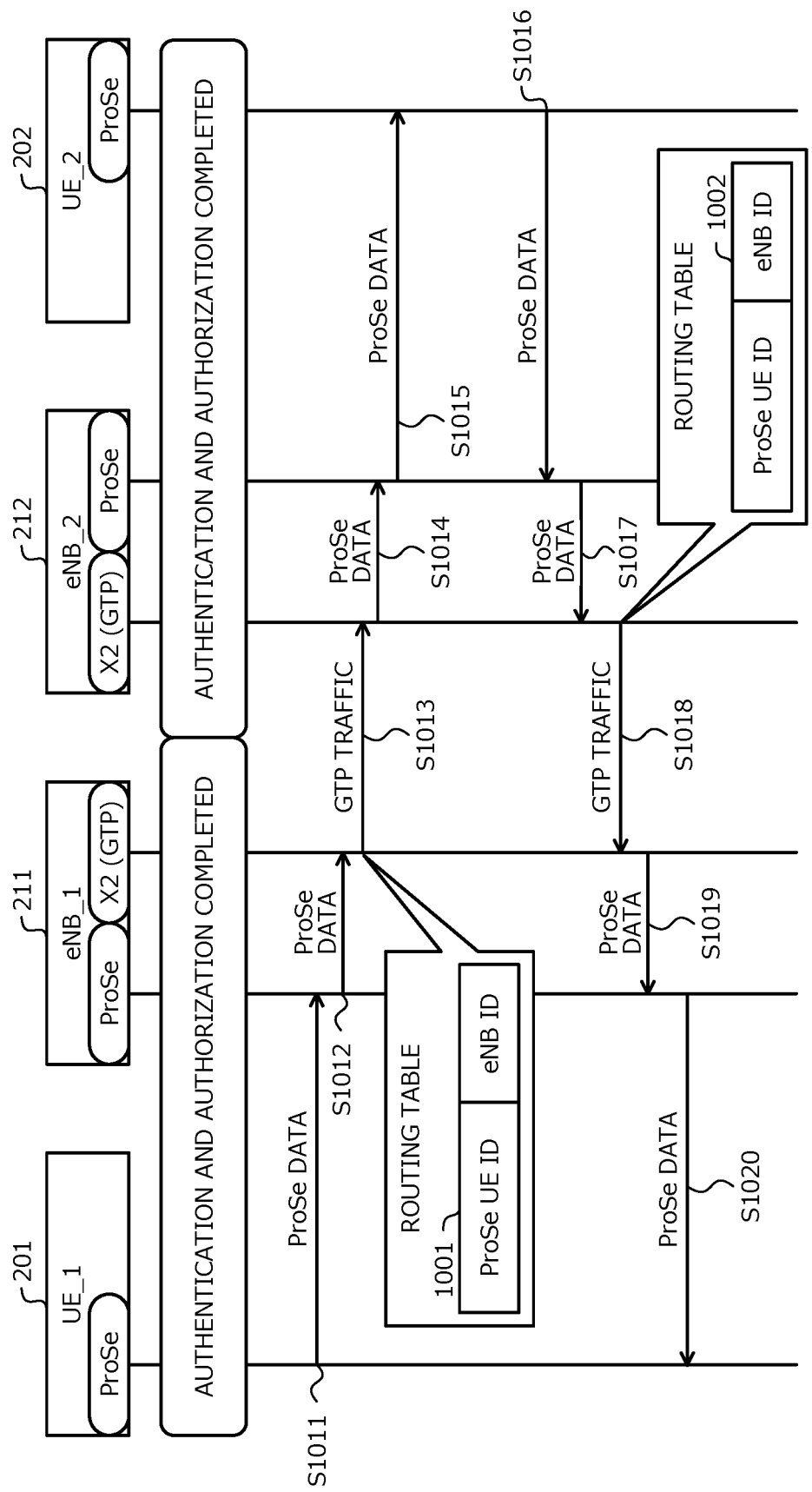
FIG. 10A is a sequence diagram of an example of communication by the isolated wireless access network.

FIG. 10A is a sequence diagram of an example of communication by an isolated wireless access network. In FIG. 10A, a case will be described in which the UEs 201, 202 are connected to the eNBs 211, 212, respectively, and the UEs 201, 202 transmit and receive user data with each other after a failure occurs in an S1 connection between the eNBs 211, 212 and the MME 221.

For example, authentication and authorization between the UE 201 and the eNB 211 are assumed to be completed by the processing depicted in FIG. 9. Further, for example, authentication and authorization between the UE 202 and the eNB 212 is also assumed to be completed by processing identical to the processing depicted in FIG. 9.

First, the UE 201 transmits to the eNB 211, ProSe data storing user data addressed to the UE 202 (step S1011). The ProSe data transmitted at step S1011 includes, for example, user data and the ProSe UE ID (destination) of the UE 202. Step S1011, for example, is performed according to the ProSe protocol of the eNB 211 and the UE 201.

Next, the ProSe protocol processing unit of the eNB 211 outputs to an X2 protocol (GTP: GPRS Tunneling Protocol) processing unit of the eNB 211, the ProSe data received at step S1011 (step S1012).

The eNB 211 converts the ProSe data output at step S1012 into GTP traffic and transmits the converted GTP traffic to the eNB 212 (step S1013). Step S1013, for example, is performed according to the X2 protocol (GTP) of the eNBs 211, 212, using an X2 connection. Further, step S1013 is performed based on a routing table 1001 stored by the eNB 211. The routing table 1001 is corresponding to information indicating relations between ProSe UE IDs and eNB IDs. Here, a reason the eNB ID becomes necessary is that when the eNB and X2 has not been set up, X2 can be newly set up.

Next, an X2 protocol (GTP) processing unit of the eNB 212 converts the GTP traffic received at step S1013 into ProSe data and outputs the converted ProSe data to the ProSe protocol processing unit of the eNB 212 (step S1014).

Next, the eNB 212 transmits to the UE 202, the ProSe data output at step S1014 (step S1015). Step S1015, for example, is performed by the ProSe protocol of the UE 202 and the eNB 212. The UE 202 can obtain from the ProSe data received at step S1015, user data from the UE 201.

Further, the UE 202 transmits to the eNB 212, ProSe data storing the user data addressed to the UE 201 (step S1016). The ProSe data transmitted at step S1016, for example, includes user data and the ProSe UE ID (destination) of the UE 201. Step S1016, for example, is performed according to the ProSe protocol of the eNB 212 and the UE 202.

Next, the ProSe protocol processing unit of the eNB 212 outputs to the X2 protocol (GTP) processing unit of the eNB 212, the ProSe data received at step S1016 (step S1017).

Next, the eNB 212 coverts the ProSe data output at step S1017 into GTP traffic and transmits the converted GTP traffic to the eNB 211 (step S1018). Step S1018 is performed according to the X2 protocol (GTP) of the eNBs 211, 212, using an X2 connection. Further, step S1018 is performed based on a routing table 1002 stored by the eNB 212. The routing table 1002 is corresponding to information indicating relations between ProSe UE IDs and eNB IDs.

An X2 protocol (GTP) processing unit of the eNB 211 converts the GTP traffic received at step S1018 into ProSe data and outputs the converted ProSe data to the ProSe protocol processing unit of the eNB 211 (step S1019).

The eNB 211 transmits to the UE 201, the ProSe data output at step S1019 (step S1020). Step S1020, for example, is performed according to the ProSe protocol of the UE 201 and the eNB 211. The UE 201 can obtain from the ProSe data received at step S1020, the user data from the UE 202.

Thus, the eNBs 211, 212, for example, can cause execution of communication between the UEs 201, 202 by ProSe after the authentication and authorization of the UEs 201, 202 by the processing depicted in FIG. 9.

In the example depicted in FIG. 10A, although a case has been described in which user data is transmitted from the UE 201 to the UE 202 and thereafter, user data from the UE 202 to the UE 201 is transmitted, the timing of the transmission of user data is not limited hereto. For example, the transmission of user data from the UE 201 to the UE 202 and the transmission of user data from the UE 202 to the UE 201 may be overlap temporally. Further, any one of transmission of user data from the UE 201 to the UE 202 and transmission of user data from the UE 202 to the UE 201 alone may be performed.

FIG. 10B is a sequence diagram of another example of communication by the isolated wireless access network. In FIG. 10B, a case is described in which the UEs 201, 202 are both connected to the eNB 211 and after an occurrence of a failure in the S1 connections between the eNB 211 and the MME 221, the UEs 201, 202 transmit and receive user data with each other.

For example, authentication and authorization between the UE 201 and the eNB 211 are assumed to be completed by the processing depicted in FIG. 9. Further, for example, authentication and authorization between the UE 202 and the eNB 212 is also assumed to be completed by processing identical to the processing depicted in FIG. 9.

First, the UE 201 transmits to the eNB 211, ProSe data storing user data addressed to the UE 202 (step S1021). The ProSe data transmitted at step S1021 includes, for example, user data and the ProSe UE ID (destination) of the UE 202. Step S1021, for example, is performed according to the ProSe protocol of the eNB 211 and the UE 201.

The eNB 211 transmits to the UE 202, the ProSe data received at step S1021 (step S1022). Step S1022, for example, is performed by the ProSe protocol of the UE 202 and the eNB 211. The UE 202 can obtain from the ProSe data received at step S1022, user data from the UE 201.

Further, the UE 202 transmits to the eNB 211, ProSe data storing the user data addressed to the UE 201 (step S1023). The ProSe data transmitted at step S1023 includes, for example, user data and the ProSe UE ID (destination) of the UE 201. Step S1023, for example, is performed according to the ProSe protocol of the eNB 211 and the UE 202.

The eNB 211 transmits to the UE 201, the ProSe data received at step S1023 (step S1024). Step S1024, for example, is performed according to the ProSe protocol of the UE 201 and the eNB 211. The UE 201 can obtain from the ProSe data received a step S1024, the user data from the UE 202.

Thus, the eNB 211, for example, can cause execution of communication between the UEs 201, 202 by ProSe after the authentication and authorization of the UEs 201, 202 by the processing depicted in FIG. 9. Further, since the UEs 201, 202 are both connected to the eNB 211, the eNB 211 relays communication between the UE 201 and the UE 202 without using an X2 connection.

In the example depicted in FIG. 10B, although a case is described in which data from the UE 201 to the UE 202 is transmitted and thereafter, user data from the UE 202 to the UE 201 is transmitted, the timing of the transmission of the user data is not limited hereto. For example, the transmission of user data from the UE 201 to the UE 202 and the transmission of user data from the UE 202 to the UE 201 may be overlap temporally. Further, any one of transmission of user data from the UE 201 to the UE 202 and transmission of user data from the UE 202 to the UE 201 alone may be performed.

FIG. 11 is a flowchart of an example of processing by an eNB. Although processing of the eNB 211 will be described, processing of the eNB 212 is the same as the processing of the eNB 211. The eNB 211, for example, repeatedly executes the steps depicted in FIG. 11.

First, the eNB 211 determines whether a failure in the S1 connection with the MME 221 has occurred (step S1101). If no failure in the S1 connection with the MME 221 has occurred (step S1101: NO), the eNB 211 performs control of causing execution of (inter-terminal) communication between the UEs 201, 202 by a path passing through the EPC 220 (step S1102), ending a series of operations.

At step S1101, if a failure in the S1 connection with the MME 221 has occurred (step S1101: YES), the eNB 211 retains a parameter related to communication of a terminal connected to the eNB 211 among the UEs 201, 202 (step S1103). Next, the eNB 211 terminates a NAS protocol process at the terminal connected to the eNB 211 among the UEs 201, 202 (step S1104). Further, the eNB 211 terminates a process thereby of relaying communication according to the NAS protocol.

Next, the eNB 211 determines whether an RRC connection re-establishment request has been received from a terminal connected to the eNB 211 among the UEs 201, 202 (step S1105), and stands by until receiving an RRC connection re-establishment request (step S1105: NO).

At step S1105, when an RRC connection re-establishment request is received (step S1105: YES), the eNB 211 performs authentication and authentication of the terminal connected to the eNB 211 among the UEs 201, 202 (step S1106). The authentication at step S1106 is performed using a ProSe protocol process supported by the eNB 211. Further, the authentication at step S1106 is performed based on the parameter retained at step S1103.

Next, the eNB 211 performs control of causing execution of (inter-terminal) communication between the UEs 201, 202 by ProSe (step S1107), ending a series of operations.

Thus, according to the second embodiment, using a ProSe process, an eNB (for example, the eNB 211) performs authentication and authorization of a terminal (for example, the UE 201) and is thereby able to cause communication by ProSe to be executed between terminals (for example, between the UEs 201, 202). As a result, termination of communication between terminals when a failure occurs in communication between the wireless access network 210 and the EPC 220 can be prevented.

Figure 12:
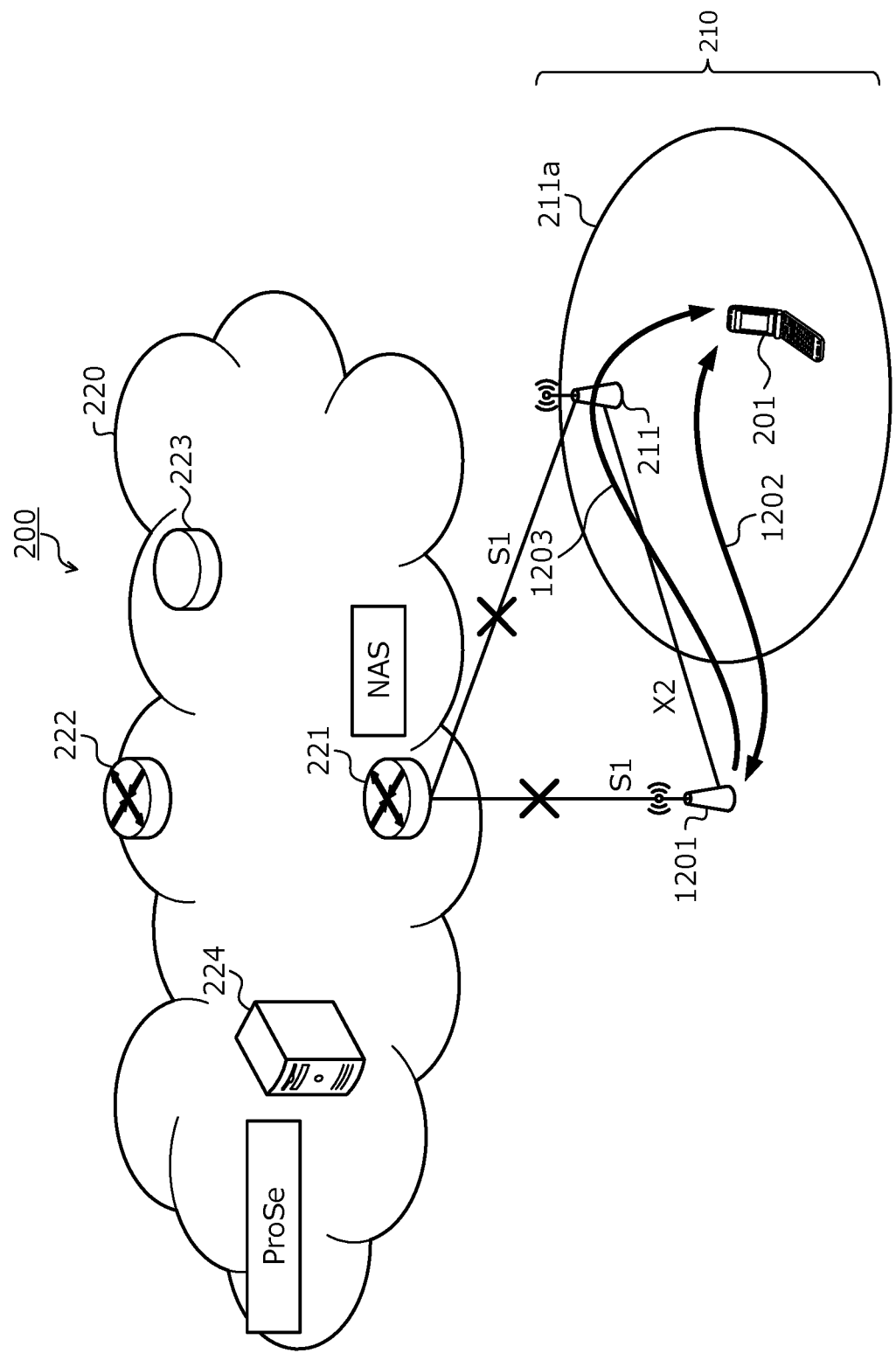
FIG. 12 is a diagram of an example of the wireless communications system according to a third embodiment.

FIG. 12 is a diagram of an example of the wireless communications system according to a third embodiment. In FIG. 12, parts identical to those depicted in FIG. 2 are given the same reference numerals used in FIG. 2 and description thereof is omitted hereinafter. As depicted in FIG. 12, the wireless communications system 200 according to the third embodiment includes a default eNB 1201 in addition to the configuration depicted in FIG. 2. In FIG. 12, the eNB 212 and the UE 202 in FIG. 2 are not depicted.

The default eNB 1201, for example, is set permanently as a ProSe UE-NW Relay. For example, the default eNB 1201 is a base station connected to the MME 221 via an S1 connection and connected to the eNB 211 via an X2 connection.

Further, the default eNB 1201 configures multiple S1 connections with the MME 221 before connectivity between the wireless access network 210 and the EPC 220 is lost. The default eNB 1201 may be a virtual base station not having a wireless communications function (coverage).

In FIG. 12, a case is described in which the UE 201 connects to the wireless access network 210 as a new ProSe UE after connectivity between the wireless access network 210 and the EPC 220 is lost.

First, the UE 201 makes a connection request to the eNB 211. In response, since the connectivity of the S1 connection between the eNB 211 and the MME 221 has been lost, the eNB 211 performs control of virtually configuring an RRC connection 1202 between the UE 201 and the default eNB 1201, via the eNB 211.

As a result, the UE 201 performs wireless communication with the eNB 211 and is able to establish virtually an RRC connection with the MME 221, via the eNB 211 and the default eNB 1201. Here, an S1 connection configured by the MME 221 before the loss of connectivity between the wireless access network 210 and the EPC 220 is used as an S2 connection between the default eNB 1201 and an MME. Further, at this time, the eNB 211 transfers control signals transmitted and received between the UE 201 and the default eNB 1201. As a result, AS level security can be established.

Next, handover 1203 of the UE 201 from the default eNB 1201 to the eNB 211 is performed. As a result, a parameter (for example, UE context) for the UE 201 to perform communication is transferred from the default eNB 1201 to the eNB 211. The parameter transferred from the default eNB 1201 to the eNB 211 includes S1 context of the S1 connection in the RRC connection with the MME 221 virtually set with respect to the UE 201.

As a result, the UE 201 is able to start communication with another terminal (for example, the UE 202) by ProSe via the eNB 211.

Thus, in the third embodiment, when the UE 201 performs an initial access, the UE 201 connects to the default eNB 1201 and thereafter, the handover 1203 to the eNB 211 neighboring the default eNB 1201 is executed. As a result, after connectivity between the wireless access network 210 and the EPC 220 is lost, even when the UE 201 connects to the wireless access network 210 as a new ProSe UE, AS level security of the UE 201 is established and communication can start.

FIG. 13 is a sequence diagram of processing when a UE connects to the isolated wireless access network in the third embodiment. In FIG. 13, a case is described in which the UE 201 performs an initial access to the wireless access network 210.

First, when a failure in a S1 connection between the eNB 211 (UE-NW Relay) and the MME 221 occurs, the eNB 211 performs transmission of a page (paging) to the UE 201, indicating that a failure occurred in the S1 connection (S1 Connection Problem) (step S1301). Step S1301, for example, is performed according to the AS (RRC) protocol of the UE 201 and the eNB 211.

Steps S1302 to S1305 depicted in FIG. 13 are identical to steps S907 to S910 depicted in FIG. 9. Subsequent to step S1305, the UE 201 performs an initial access (Very Initial Access) to the default eNB 1201 via the eNB 211 (step S1306). As a result, RRC connection is established (RRC Connection Establishment) and AS level security of the UE 201 is established. Step S1306, for example, is performed according to the AS (RRC) protocol of the eNB 211 and the UE 201.

Further, the UE 201 retains AS information of the UE 201, such as C-RNTI (step S1307). Step S1307, for example, is performed according to the AS (RRC) protocol of the UE 201. Further, the C-RNTI retained at step S1307, for example, is the C-RNTI allocated to the UE 201 in the establishment of the RRC connection at step S1306.

Next, handover (Handover) of the UE 201 from the default eNB 1201 to the eNB 211 is performed (step S1308). As a result, a parameter related to communication of the UE 201 (for example, UE context) is transferred from the default eNB 1201 to the eNB 211. The eNB 211 retains the parameter transferred from the default eNB 1201.

Next, the eNB 211 performs authentication concerning the UE 201 (step S1309). Step S1309, for example, is performed according to the AS (RRC) protocol of the eNB 211. At step S1309, the eNB 211, for example, performs the authentication by comparing the retained UE context of the UE 201 and the C-RNTI of the UE 201 obtained by the handover at step S1308. Further, the eNB 211 may perform the authentication by comparing the retained UE context of the UE 201 and the PCI or short MAC-I obtained by the handover at step S1308.

Next, the AS (RRC) protocol processing unit of the eNB 211 makes an authorization request to the ProSe protocol processing unit of the eNB 211 for the UE 201, (step S1310). The authorization request at step S1310, for example, is performed by the AS (RRC) protocol processing unit of the eNB 211 notifying the ProSe protocol processing unit of the eNB 211 of the ProSe UE ID of the UE 201.

Next, the eNB 211 performs authorization concerning the UE 201, via the ProSe protocol processing unit (step S1311). For example, the eNB 211 performs the authorization of the UE 201 by comparing the retained UE context of the UE 201 and the ProSe UE ID of the UE 201 notified by the authorization request at step S1310. Next, the ProSe protocol processing unit of the eNB 211 notifies the AS (RRC) protocol processing unit of the eNB 211 of an authorization result obtained at step S1311 (step S1312).

Next, the eNB 211 allocates an IP address to the UE 201 (IP Address Allocation) (step S1313). Step S1313, for example, is performed by an IP layer of the UE 201 and a processing unit (IP-Relay) performing a process when the eNB 211 operates as an IP relay apparatus. Further, step S1313, for example, is performed using Dynamic Host Configuration Protocol (DHCP) v4.

Next, the UE 201 sets the IP address allocated at step S1313 as the IP address of the UE 201 (step S1314). Step S1314, for example, is performed according to the IP protocol of the UE 201.

Further, the UE 201 sets the ProSe UE ID of the UE 201 (step S1315). The ProSe UE ID set by the UE 201 at step S1315, for example, is the ProSe UE ID of the UE 201 before the occurrence of the failure in the S1 connection of the eNB 211 and the MME 221. Alternatively, the ProSe UE ID set by the UE 201 at step S1315 may be a ProSe UE ID stored in, for example, a Universal Integrated Circuit Card (UICC: universal IC card).

As a result, an IP address and a ProSe UE ID are configured for the UE 201. Further, for example, by processing identical to that depicted in FIG. 13, an IP address and a ProSe UE ID are configured for the UE 202. For example, the user data depicted in FIG. 10A is transmitted and received between the UEs 201, 202.

Here, the UE 201 can use the C-RNTI retained at step S1307 to receive downlink signals wirelessly transmitted from the eNB 211. For example, the eNB 211 scrambles and transmits downlink signals to the UE 201, using the C-RNTI allocated to the UE 201. The UE 201 receives the downlink signals from the eNB 211 by descrambling based on the C-RNTI allocated to the UE 201. Downlink signals from the eNB 211 to the UE 201 are, for example, an Enhanced-Physical Downlink Control Channel (E-PDCCH), a Physical Downlink Shared Channel (PDSCH), etc.

Thus, according to the third embodiment, even when the UE 201 connects to the wireless access network 210 as a new ProSe UE after connectivity between the wireless access network 210 and the EPC 220 is lost, effects identical to those of the second embodiment can be obtained.

In other words, using a ProSe process, an eNB (for example, the eNB 211) performs authentication and authorization of a terminal (for example, the UE 201) and is thereby able cause communication by ProSe to be executed between terminals (for example, between the UEs 201, 202).

As a result, termination of communication between terminals when a failure occurs in communication between the wireless access network 210 and the EPC 220 can be prevented.

Further, the default eNB 1201 retains an S1 connection with the EPC 220 before connectivity between the wireless access network 210 and the EPC 220 is lost. When the UE 201 makes a connection request to the eNB 211 after the connectivity between the wireless access network 210 and the EPC 220 has been lost, a connection process between the UE 201 and the default eNB 1201 is performed via the eNB 211. Here, an S1 connection configured by the default eNB 1201 is used whereby an RRC connection with the MME 221 can be virtually configured for the UE 201.

Therefore, even when the UE 201 connects to the wireless access network 210 as a new ProSe UE after the connectivity between the wireless access network 210 and the EPC 220 is lost, an RRC connection with the MME 221 may be virtually configured for the UE 201. Further, the UE 201 for which the RRC connection is virtually configured is handed over from the default eNB 1201 to the eNB 211, high load at the default eNB 1201 can be prevented.

Further, a combination of the second and third embodiments is possible. For example, in the wireless communications system 200, when the UEs 201, 202 are communicating with each other by a path passing through the eNB 211 and the EPC 220 and a failure occurs in the S1 connection, authentication and authorization is performed by the processing depicted in FIG. 9. When the UE 201 performs an initial access to the wireless access network 210 when a failure has occurred in the S1 connection, authentication and authorization are performed by the processing depicted in FIG. 13.

As described, according to the wireless communications system, the base station, and the terminal, termination of communication when a failure occurs in communication between a packet core network and a wireless access network can be prevented.

For example, conventionally, when the connection between a wireless access network and packet core network is disconnected, communication is terminated and in order to continue communication, the recovery of a link (for example, fiber access) to the packet core network is awaited. Therefore, for example, communication is interrupted, recovery is awaited, and reconnection follows.

In contrast, according to the embodiments described above, for example, a ProSe layer is provided in a base station and control is performed so that communication authentication and authorization is performed, enabling the base station to retain the state before connectivity with the packet core network was lost. The base station is able to use retained information, for example, to perform communication authentication at the AS layer, and to perform communication authentication at the ProSe layer. As a result, when the connectivity between the wireless access network and the packet core network is lost, communication is immediately resumed, enabling communication to be continued.

For example, under SA1 of the 3rd Generation Partnership Project (3GPP), IOPS, which enables communication to be continued even when a core network is isolated from a wireless access network is studied. For example, under IOPS, assumed scenarios include, for example, assurance of alternate path during station during group communication, assurance of alternate path during station during individual communication, in-station routing according to direct communication protocol, etc. Further assumed scenarios under IOPS include, for example, narrowband backhauling, wideband isolated wireless access networks, and movement between an isolated wireless access network and a normal wireless access network. The embodiments described are applicable to these scenarios.

However, with the conventional techniques described above, when a failure such as a disconnection occurs between the packet core network and the wireless access network, in continuing communication between terminals, communication interruption occurs from the failure until recovery and communication between the terminals may be terminated.

According to one aspect of the present invention, an effect is achieved in that when a failure in communication between a packet core network and a wireless access network occurs, termination of the communication can be prevented.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communications system comprising:
a packet core network, and
a wireless access network including a base station and a plurality of terminals, wherein the base station is configured to be capable of performing a process related to a proximity-based communications service between the plurality of terminals and when a failure in a connection between the base station and the packet core network occurs, the base station causes execution of proximity-based communication between the plurality of terminals by performing authentication and authorization of communication with a terminal connected to the base station among the plurality of terminals by using the process related to the proximity-based communications service, and wherein the base station that causes execution of the proximity-based communication retains, when the failure occurs while the plurality of terminals are communicating with each other by a path through the base station and the packet core network, a parameter related to communication at a terminal connected to the base station, the base station performing the authentication and authorization of the communication based on the retained parameter, the retained parameter being allocated to the terminal prior to execution of the proximity-based communication.

2. The wireless communications system according to claim 1, wherein the base station that causes execution of the proximity-based communication terminates, when the failure occurs, a process of performing communication of the base station and the terminal connected to the base station with the packet core network.

3. The wireless communications system according to claim 2, wherein the base station that causes execution of the proximity-based communication receives a reestablishment request from the terminal and based on the received reestablishment request, performs the authentication and authorization of the communication, after terminating the process of performing communication with the packet core network, concerning the base station and the terminal connected to the base station.

4. The wireless communications system according to claim 3, wherein the reestablishment request is a reestablishment request due to terminating the process of performing communication with the packet core by the base station that causes execution of the proximity-based communications.

5. The wireless communications system according to claim 1, wherein
a first terminal included among the plurality of terminals, when connecting to the wireless access network after the failure occurs, connects, via the base station that causes execution of the proximity-based communication between the plurality of terminals, to a second base station different from the base station and performs handover from the second base station to the base station,
the second base station transfers to the base station, a parameter related to communication at the first terminal handed over to the base station, and
the base station causes execution of the proximity-based communication between the first terminal and a second terminal different from the first terminal among the plurality of terminals by performing, based on the parameter transferred from the second base station, the authentication and authorization of communication with the first terminal handed over to the base station.

6. The wireless communications system according to claim 5, wherein
the second base station configures a connection with the packet core network before the failure occurs, and
the first terminal connects to the second base station via the base station after the failure occurs, to virtually connect to the packet core network by a path including the connection and performs handover from the second base station to the base station.

7. A base station of a wireless communications system including a packet core network and a wireless access network including the base station and a plurality of terminals, the base station comprising:
a communications device configured to perform communication with the packet core network and detect a failure in a connection between the packet core network and the base station; and
a controller configured to be capable of performing a process related to a proximity-based communications service between the plurality of terminals and when a failure is detected by the communications device, the controller causes execution of proximity-based communication between the plurality of terminals by performing authentication and authorization of communication with a terminal connected to the base station among the plurality of terminals by using the process related to the proximity-based communications service, wherein
the base station that causes execution of the proximity-based communication retains, when the failure occurs while the plurality of terminals are communicating with each other by a path through the base station and the packet core network, a parameter related to communication at a terminal connected to the base station, the base station performing the authentication and authorization of the communication based on the retained parameter, the retained parameter being allocated to the terminal prior to execution of the proximity-based communication.

8. A terminal of a wireless communications system including a packet core network and a wireless access network including a base station and the terminal, the terminal comprising:
  a communications device configured to communicate with another terminal; and
  a controller configured to control communication by the communications device based on a control signal from the base station configured to be capable of performing a process related to a proximity-based communications service between a plurality of terminals including the terminal, and
  wherein when a failure in a connection between the base station and the packet core network occurs, proximity-based communication between the plurality of terminals is caused to occur based on authentication and authorization of communication between the base station and the terminal, and
  wherein the terminal is further configured:
  to retain, when the failure occurs while the plurality of terminals are communicating with each other by a path through the base station and the packet core network, a parameter related to communication at the terminal connected to the base station; and
  to perform the authentication and authorization of the communication based on the retained parameter, the retained parameter being allocated to the terminal prior to execution of the proximity-based communication.

* * * * *